United States Patent
Klaus et al.

(10) Patent No.: US 7,167,230 B2
(45) Date of Patent: Jan. 23, 2007

(54) LIQUID CRYSTAL VARIABLE WAVELENGTH FILTER UNIT, AND DRIVING METHOD THEREOF

(75) Inventors: Werner Klaus, Tokyo (JP); Masafumi Ide, Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 427 days.

(21) Appl. No.: 10/497,239

(22) PCT Filed: Dec. 5, 2002

(86) PCT No.: PCT/JP02/12784

§ 371 (c)(1),
(2), (4) Date: Jun. 2, 2004

(87) PCT Pub. No.: WO03/048846

PCT Pub. Date: Jun. 12, 2003

(65) Prior Publication Data
US 2005/0078237 A1    Apr. 14, 2005

(30) Foreign Application Priority Data
Dec. 6, 2001 (JP) .............................. 2001-372449

(51) Int. Cl.
*G02F 1/13* (2006.01)
*G02F 1/1335* (2006.01)

(52) U.S. Cl. ........................ 349/202; 349/18; 349/198; 359/478

(58) Field of Classification Search ................ 349/202, 349/198, 18; 359/478–479
See application file for complete search history.

(56) References Cited

U.S. PATENT DOCUMENTS

| | | | | |
|---|---|---|---|---|
| 4,729,641 A | * | 3/1988 | Matsuoka et al. | 349/200 |
| 5,126,869 A | * | 6/1992 | Lipchak et al. | 349/202 |
| 5,253,033 A | * | 10/1993 | Lipchak et al. | 356/4.01 |
| 6,104,446 A | * | 8/2000 | Blankenbecler et al. | 349/5 |
| 6,481,861 B1 | * | 11/2002 | Cao et al. | 359/868 |
| 6,522,467 B1 | * | 2/2003 | Li et al. | 359/484 |
| 6,529,326 B1 | * | 3/2003 | Cai | 359/498 |

(Continued)

FOREIGN PATENT DOCUMENTS

JP     5-80358     4/1993

(Continued)

*Primary Examiner*—James A. Dudek
(74) *Attorney, Agent, or Firm*—Westerman, Hattori, Daniels & Adrian, LLP.

(57) ABSTRACT

A liquid crystal variable wavelength filter unit and its driving method applicable for a Wavelength Division Multiplexing (WDM) communication system and an optical network using an optical fiber. The liquid crystal variable wavelength filter unit (130) includes a band pass filter (111) configured of a dielectric multi-layered film inclined by a predetermined angle of α between a first liquid crystal beam deflector (101) and a second liquid crystal beam deflector (103) and held between a first wedge prism (121) and a second wedge prism (123). The first drive device (141) is connected to the first liquid crystal beam deflector (101), and the second drive device (143) is connected to the second liquid crystal beam deflector (103). The wavelength is selected by the liquid crystal beam deflector by making the outgoing angle variable with respect to the band pass filter.

15 Claims, 23 Drawing Sheets

U.S. PATENT DOCUMENTS

| | | | |
|---|---|---|---|
| 6,587,180 B1* | 7/2003 | Wang et al. | 349/202 |
| 6,992,809 B1* | 1/2006 | Wang et al. | 359/279 |
| 7,009,680 B1* | 3/2006 | Cavanaugh et al. | 349/196 |
| 7,057,799 B1* | 6/2006 | Chu | 359/308 |
| 2002/0003601 A1* | 1/2002 | Wang et al. | 349/202 |
| 2002/0159153 A1* | 10/2002 | Nishimura et al. | 359/578 |
| 2003/0133651 A1* | 7/2003 | Hakimi et al. | 385/27 |
| 2003/0142378 A1* | 7/2003 | Mears et al. | 359/15 |
| 2004/0010196 A1* | 1/2004 | Wang et al. | 600/476 |
| 2004/0218253 A1* | 11/2004 | Chu | 359/308 |

FOREIGN PATENT DOCUMENTS

| | | |
|---|---|---|
| JP | 6-51113 | 2/1994 |
| JP | 6-130339 | 5/1994 |
| JP | 9-90247 | 4/1997 |

* cited by examiner

US 7,167,230 B2

LIQUID CRYSTAL VARIABLE WAVELENGTH FILTER UNIT, AND DRIVING METHOD THEREOF

TECHNICAL FIELD

The present invention relates to a liquid crystal variable wavelength filter unit, and more particularly to a liquid crystal variable wavelength filter unit and a driving method thereof for use in a Wavelength Division Multiplexing (WDM) communication method and an optical network using an optical fiber.

BACKGROUND ART

Today's wavelength division multiplexing (WDM: wavelength division multiplexing) communication method using an optical fiber is an electro-optic hybrid system, and a technology is advancing to provide an all-optical network in which signals are processed directly from light. A variable wavelength filter (tunable filter), which makes it possible to select a wavelength, is thought to play an important role in this optical network. A variable wavelength filter (tunable filter) finds applications, for example, in a dynamic add/drop multiplexer or a wavelength router.

Conventionally, various methods have been proposed as a variable wavelength filter (tunable filter) such as a method that mechanically controls the optical path length (MEMS: microelectromechanical system), a Mach-Zehnder type filter that combines a light guide with the thermo-optic effect, and a filter that uses acoustooptics. References that describe those method are, for example, V. M. Bright "Selected Papers On Optical MEMS", Vol. MS153, SPIE, 1999 and H. T. Mouftah and J. M. H. Elmirghani, "Photonic Switching Technology", IEEE, 1999. Among various methods, a liquid crystal variable wavelength filter (tunable filter) is expected as a variable wavelength filter (tunable filter) applicable to an optical network because it has not mechanical moving parts and consumes less power. The following describes a Fabry-Perot type filter, in which a liquid crystal layer is used as the cavity, as a typical example.

The references to the above-described liquid crystal Fabry-Perot type filter are, for example, K. Hirabayashi, H. Tsuda, and T. Kurokawa, J Lightwave Technol., vol. 11, No. 12, pp. 2033–2043, 1993. FIG. 22 shows a cross sectional diagram of a basic liquid crystal Fabry-Perot filter. A liquid crystal Fabry-Perot filter 1000 comprises a cavity layer 1003 held between a first dielectric multi-layered film mirror 1017 and a second dielectric multi-layered film mirror 1019 and filled with nematic liquid crystal material 1001. The nematic liquid crystal material 1001 is aligned by a first alignment film 1013 and a second alignment film 1015 so that it is aligned parallel to the film surfaces with pretilt in the cross sectional diagram in FIG. 22.

At this time, anisotropy is induced on the surface of the first alignment film 1013 and the second alignment film 1015 by rubbing. In addition, to allow the cavity layer 1003 to have a predetermined gap, a spacer 1021 is provided to fix a first filter substrate 1005 and a second filter substrate 1007. And, a first transparent conductive film 1009 and a second transparent conductive film 1011 are formed to apply an electric field to the nematic liquid crystal material 1001.

In the liquid crystal Fabry-Perot filter 1000, the cavity layer 1003 configures a resonator and the refractive index of the cavity layer 1003 determines the optical path length. The liquid crystal Fabry-Perot filter 1000 changes the refractive index of the cavity layer 1003 and changes the product of this refractive index and the cavity layer to change the resonant wavelength. The resonant wavelength $\lambda m$ of the liquid crystal. Fabry-Perot filter 1000 is given as follows.

$$\lambda m = 2 n_{eff}(V) \cdot d / m \quad (1)$$

where, $n_{eff}(V)$ is the effective extraordinary refractive index of the cavity layer 1003 and is the function of the applied voltage V. d is the cavity gap, and m is an integer.

In FIG. 22, out of an incoming linearly polarized beam 1031 that enters vertically from above and that is parallel to the cross sectional diagram, only the light with the wavelength corresponding to the resonant wavelength $\lambda m$, shown in equation (1), transmits through the liquid crystal Fabry-Perot filter 1000 as an outgoing linearly polarized light 1033. The effective extraordinary refractive index $n_{eff}(0)$ with no electric field applied to the nematic liquid crystal material 1001 is a constant value in the cavity layer 1003, as shown below, when pre-tilt angle of a liquid crystal director 1041 is $\theta 0$.

$$n_{eff}(0) = (\sin^2 \theta 0 / n0^2 + \cos^2 \theta 0 / ne^2)^{-1/2} \quad (2)$$

where n0 is an ordinary refractive index and ne is an extraordinary refractive index.

When an electric field is applied to the nematic liquid crystal material 1001, the tilt angle $\theta p$ becomes a large value in the central part in the thickness direction of the cavity layer 1003 according to the applied voltage. This tilt angle $\theta p$ approaches $\theta 0$ as it gets near to the first alignment film 1013 and the second alignment film 1015. Therefore, when the electric field V is applied to the nematic liquid crystal material 1001, the average of the effective extraordinary refractive index $n_{eff}(V)$ of the cavity layer 1003 in the thickness direction becomes a smaller value as compared with that when no electric field is applied. As shown in equation (1), the value of the resonant wavelength $\lambda m$ shifts to the shorter wavelength side when compared using the resonant wavelength $\lambda m$ of the same order m. Thus, the liquid crystal Fabry-Perot filter 1000 capable of selectively transmitting a predetermined wavelength can be used as a tunable filter.

However, because the cavity layer 1003 is configured as a liquid crystal cell in the liquid crystal Fabry-Perot filter 1000 such as the one shown in FIG. 22, the cavity layer is a single layer in structure. Therefore, the relation between the transmittance and the wavelength of the liquid crystal Fabry-Perot filter is as shown by a characteristic 2201 in FIG. 23. The characteristic 2201 shows a transmission band characteristic that have the low isolation characteristic of the stop band near the transmission band and that have a steep peak. On the other hand, the ideal characteristic of a variable length filter (tunable filter) is that the isolation characteristic of the stop band near the transmission band is high and that the transmission band characteristic is flat (flat top). A characteristic 2203 in FIG. 23 shows an example of characteristic ideal for 1.6 nm interval (200 G Hz).

As described above, a liquid crystal Fabry-Perot filter has the characteristic 2201 that is significantly different from the characteristic 2203. Those characteristics are a reason that a variable length filter (tunable filter) using a liquid crystal Fabry-Perot filter is not applicable to a dense wavelength division multiplexing (WDM) communication system.

In addition, because the cavity layer 1003 is formed by the nematic liquid crystal material 1001 in FIG. 22, the dielectric multi-layered film mirrors 1017 and 1019 must be formed within the liquid crystal cell. The dielectric multi-layered film mirrors 1017 and 1019 are configured by a film stack of optically quarter wavelength films using, for example, tantalum pentoxide ($Ta_2O_5$) as a highly refractive material and silicon dioxide ($SiO_2$) as a low refractive material. For a 1.55 μm band used for optical communication, the dielectric multi-layered film mirrors 1017 and 1019 must be several microns thick and, therefore, the liquid crystal cell fabrication process, such as the gap control and electrode formation of the liquid crystal Fabry-Perot filter 1000, becomes difficult.

Therefore, it is an object of the present invention to provide a liquid crystal variable wavelength filter unit and its driving method that simplifies the liquid crystal cell structure and that is applicable to high-grade optical fiber communication.

DISCLOSURE OF THE INVENTION

To achieve the above objects, the present invention basically employs the following technical configuration and includes the means described below.

First means according to the present invention is a liquid crystal variable wavelength filter unit, capable of selecting a predetermined wavelength of an incoming beam using liquid crystal, that comprises a liquid crystal beam deflector for making an outgoing angle of a transmission light variable; and a band pass filter provided on an outgoing side of the liquid crystal beam deflector. A wavelength is selected by allowing the liquid crystal beam deflector to change the outgoing angle of a light entering the band pass filter.

Second means according to the present invention uses a configuration in which the liquid crystal beam deflector makes the outgoing angle variable within a predetermined positive or negative angle range, including avertical angle, with respect to an incoming surface of the band pass filter.

Third means according to the present invention uses a configuration in which the liquid crystal beam deflector and the band pass filter are arranged vertically to an incoming beam.

Fourth means according to the present invention uses a configuration in which the liquid crystal beam deflector is arranged vertically to an incoming beam and the band pass filter is inclined by a predetermined angle with respect to the optical axis of the incoming beam.

Fifth means according to the present invention uses a configuration in which a plurality of liquid crystal beam deflectors are stuck together to make an outgoing angle variable, the outgoing angle being a sum of deflection angles of the liquid crystal beam deflectors.

Sixth means according to the present invention is a liquid crystal variable wavelength filter unit, capable of selecting a predetermined wavelength of an incoming beam using liquid crystal, that comprises two liquid crystal beam deflectors each of which has a liquid crystal layer held between a first transparent substrate, which has a plurality of individual electrodes formed of transparent conductors arranged in a parallel stripe form, and a second transparent substrate, which has a common electrode formed of a transparent conductor, and is configured in such a way that a refractive index modulation is generated in the liquid crystal layer by applying a predetermined voltage to the individual electrodes formed on the first transparent substrate; and a band pass filter held between the two liquid crystal beam deflectors.

Seventh means according to the present invention uses a configuration in which the band pass filter is a dielectric multi-layered film formed by alternately laminating a high refractive layer and a low refractive layer.

Eighth means according to the present invention uses a configuration in which the plurality of individual electrodes are divided into a plurality of groups, a plurality of individual electrodes of each group are connected to a common collector electrode, and a pair of signal electrodes are connected to both ends of the collector electrode.

Ninth means according to the present invention uses a configuration in which the collector electrode is formed of the same material as that of the individual electrodes.

Tenth means according to the present invention uses a configuration in which the liquid crystal layers of the two liquid crystal beam deflectors are arranged almost in parallel and the band pass filter is inclined a predetermined angle with respect to the two liquid crystal beam deflectors.

Eleventh means according to the present invention uses a configuration in which the two liquid crystal beam deflectors has a function to make parallel an incoming beam and an outgoing light to and from the liquid crystal variable wavelength filter unit by changing a light of a specific deflection component, which enters one of the liquid crystal beam deflectors, by a predetermined angle of θ and by changing the light by an angle of −θ by another liquid crystal beam deflector.

In addition, twelfth means according to the present invention is a driving method for the liquid crystal variable wavelength filter unit of the eighth means wherein drive waveforms at different voltages are applied to a pair of signal electrodes of at least one of the groups.

Thirteenth means according to the present invention is a driving method for driving the liquid crystal variable wavelength filter unit of the eighth means wherein a period, in which an alternating voltage is applied to one of signal electrodes of a pair of signal electrodes of at least one of the groups and another signal electrode is set to 0[V], and a period, in which an alternating voltage is applied to the another signal electrode and the one of signal electrodes is set to 0[V], are provided alternately.

Fourteenth means according to the present invention is a method in which the alternating voltage is a voltage generated through pulse width modulation.

Fifteenth means according to the present invention is a method in which there is a period in which an alternate current bias is applied from the common electrode to the liquid crystal layer.

BEST MODE FOR CARRYING OUT THE INVENTION

A liquid crystal variable wavelength filter unit and its driving method in a best mode of the present invention will be described below with reference to the drawings.

Figure 1:
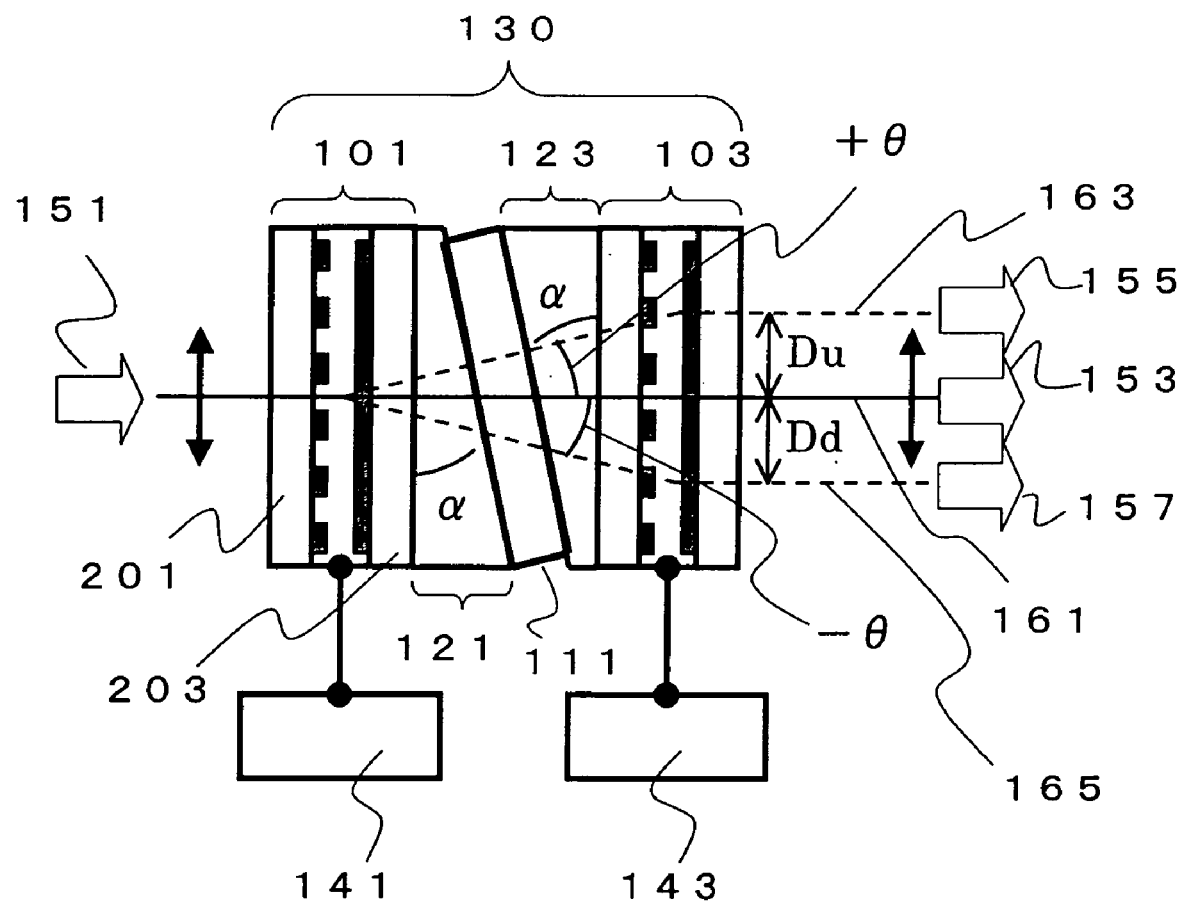
FIG. 1 is a schematic cross sectional diagram showing a liquid crystal variable wavelength filter unit in an embodiment of the present invention.

First, the configuration of a liquid crystal variable wavelength filter unit in an embodiment of the present invention will be described with reference to FIG. 1. FIG. 1 is a cross sectional diagram showing the configuration of a liquid crystal variable wavelength filter unit 130 in the embodiment of the present invention.

As shown in FIG. 1, the liquid crystal variable wavelength filter unit 130 according to the present invention includes a band pass filter 111 formed of a dielectric multi-layered film inclined by a predetermined angle of a between a first liquid crystal beam deflector 101 and a second liquid crystal beam deflector 103, which are parallel to each other, and held between a first wedge prism 121 and a second wedge prism 123 both of which have a shape of a wedge. A first drive device 141 is connected to the first liquid crystal beam deflector 101, and a second drive device 143 is connected to the second liquid crystal beam deflector 103.

The first and second liquid crystal beam deflectors 101 and 103 each include a liquid crystal layer held between a plurality of individual electrodes, composed of transparent conductive films which are parallel stripes, and a common electrode. Applying a predetermined voltage to the plurality of individual electrodes induces a spatial refractive index modulation region in the liquid crystal layer to implement a blazed diffraction grating.

The first liquid crystal beam deflector 101 controls the incident angle of specific deflection components that enter the band pass filter 111. Controlling the incident angle of the light that enters the band pass filter 111 can change the transmission band characteristic of the liquid crystal variable wavelength filter unit 130. In addition, the second liquid crystal beam deflector 103 deflects the beam of specific deflection components in the direction opposite to the direction determined by the first liquid crystal beam deflector 101. Therefore, the light that enters the first liquid crystal beam deflector 101 and the light that exits the second liquid crystal beam deflector 103 are kept parallel.

Next, the wave-guide path of an incoming beam 151 of specific deflection components, which enters the liquid crystal variable wavelength filter unit 130 according to the present invention, will be described more in detail. As shown in FIG. 1, the incoming beam 151, which enters the first liquid crystal beam deflector 101 with the polarization state parallel to the page of FIG. 1, exits the first liquid crystal beam deflector 101 with an outgoing angle θ of 0 degree when the first liquid crystal beam deflector 101 does not deflect the light, and only the components that are wavelength-selected by the band pass filter 111 enter the second liquid crystal beam deflector 103 along a first path 161. At this time, the second liquid crystal beam deflector 103 does not deflect the light but outputs it along the first path 161 as a first outgoing light 153.

When the incoming beam 151 is deflected by the first liquid crystal beam deflector 101 by +θ in the positive direction, the wavelength components transmitting through the band pass filter 111 pass along a second path 163 and enter the second liquid crystal beam deflector 103. The second liquid crystal beam deflector 103 deflects the light, which passed along the second path, by −θ in the negative direction and outputs it as a second outgoing light 155.

When the incoming beam 151 is deflected by the first liquid crystal beam deflector 101 by −θ in the negative direction, the wavelength components transmitting through the band pass filter 111 pass along a third path 165 and enter the second liquid crystal beam deflector 103. The second liquid crystal beam deflector 103 deflects the light, which passed along the third path 165, by +θ in the positive direction and outputs it as a third outgoing light 157. The incoming beam 151 and first, second, and third outgoing lights 153, 155, and 157 are parallel.

As described above, the first liquid crystal beam deflector 101 deflects the incoming beam 151 by a predetermined angle of ±θ as shown in FIG. 1. Here, let θmax be the maximum value of the variable range of θ where, in FIG. 1, the positive direction is the direction in which the value increases in the counterclockwise direction. To fully utilize the variable range of θ, it is necessary to set the angle α of the first and second wedge prisms 121 and 123 so that α≧θmax.

Figure 2:
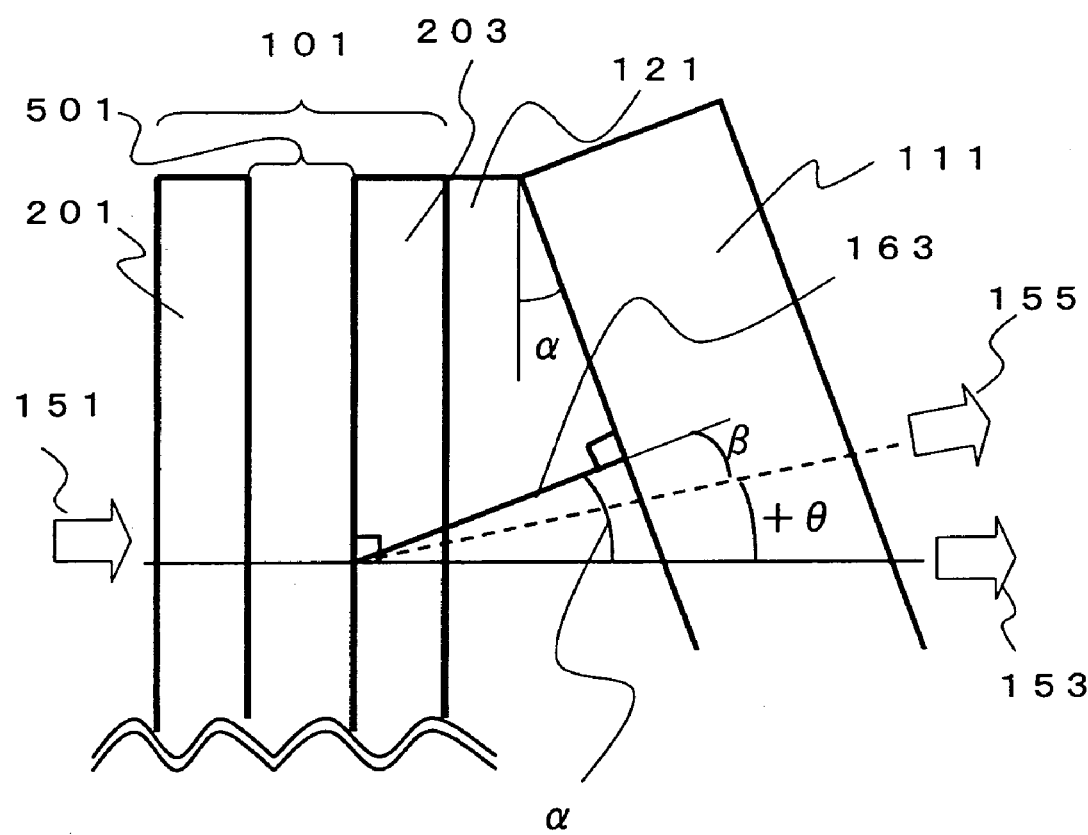
FIG. 2 is a close-up of the main part of a first liquid crystal beam deflector and a band pass filter of the liquid crystal variable wavelength filter unit in the embodiment of the present invention.

FIG. 2 is a close-up of the main part of the first liquid crystal beam deflector 101 and the band pass filter 111 in FIG. 1. Let the angle θ be the outgoing angle with the surface of a second transparent substrate 203 of the first liquid crystal beam deflector 101 that contacts a nematic liquid crystal layer 501 as the basis, and let the angle β be the incident angle of the band pass filter 111. Then, the relation between the outgoing angle θ and the incident angle β is expressed by the following equations.

$$\beta = \alpha - \theta \text{ when } \theta = +\theta$$

$$\beta = \alpha \text{ when } \theta = 0$$

$$\beta = \alpha + \theta \text{ when } \theta = -\theta$$

where α≧θmax.

As described above, inclining the band pass filter 111 by an angle of α with respect to the two liquid crystal beam deflectors causes the first liquid crystal beam deflector 101 to deflect the incoming linearly polarized beam by an angle of θ and thus converts the light to a light having a predetermined positive incident angle of β with respect to the band pass filter 111.

Next, an example of the actual configuration of the band pass filter will be described. The band pass filter 111 can be selected from predetermined optical filters, composed of a dielectric multi-layered film, according to the specification described below. Because an optical signal in the 1300 nm band or 1550 nm band is used for optical fiber communication in many cases, an optical signal with the center wavelength of 1550 nm will be described below. For example, the following describes a band pass filter having a dielectric multi-layered film with a 4-cavity configuration in which the center wavelength is 1550 nm when the incident angle β is 0 degree.

The band pass filter 111 can be configured, for example, by alternately laminating a high refractive film and a low refractive film. A material such as tantalum pentoxide can be selected as the highly refractive film, and a material such as silicon dioxide can be selected as the low refractive film.

As an example of film design, the band pass filter can have the following configuration:

glass/1.3H/L/(HL)$^6$/H/10L/H/(LH)$^6$/L/(HL)$^7$/H/10L/
H/(LH)$^7$/L/(HL)$^7$/H/8L/H/(LH)$^7$/L/(HL)$^7$/H/4L/
H/(LH)$^7$/glass, where a high refractive film is represented by a film H whose center wavelength is 1550 nm and whose optical path length is a quarter wavelength and a low refractive film is represented by a film L whose center wavelength is 1550 nm and whose optical path length is a quarter wavelength. In the above notation, an exponentiation represents the number of film layers, and 10L, 10L, 8L, and 4L each represent a cavity. Any other configuration can also be used if it can implement a filter with characteristics suitable for wavelength division multiplexing communication.

Figure 3:
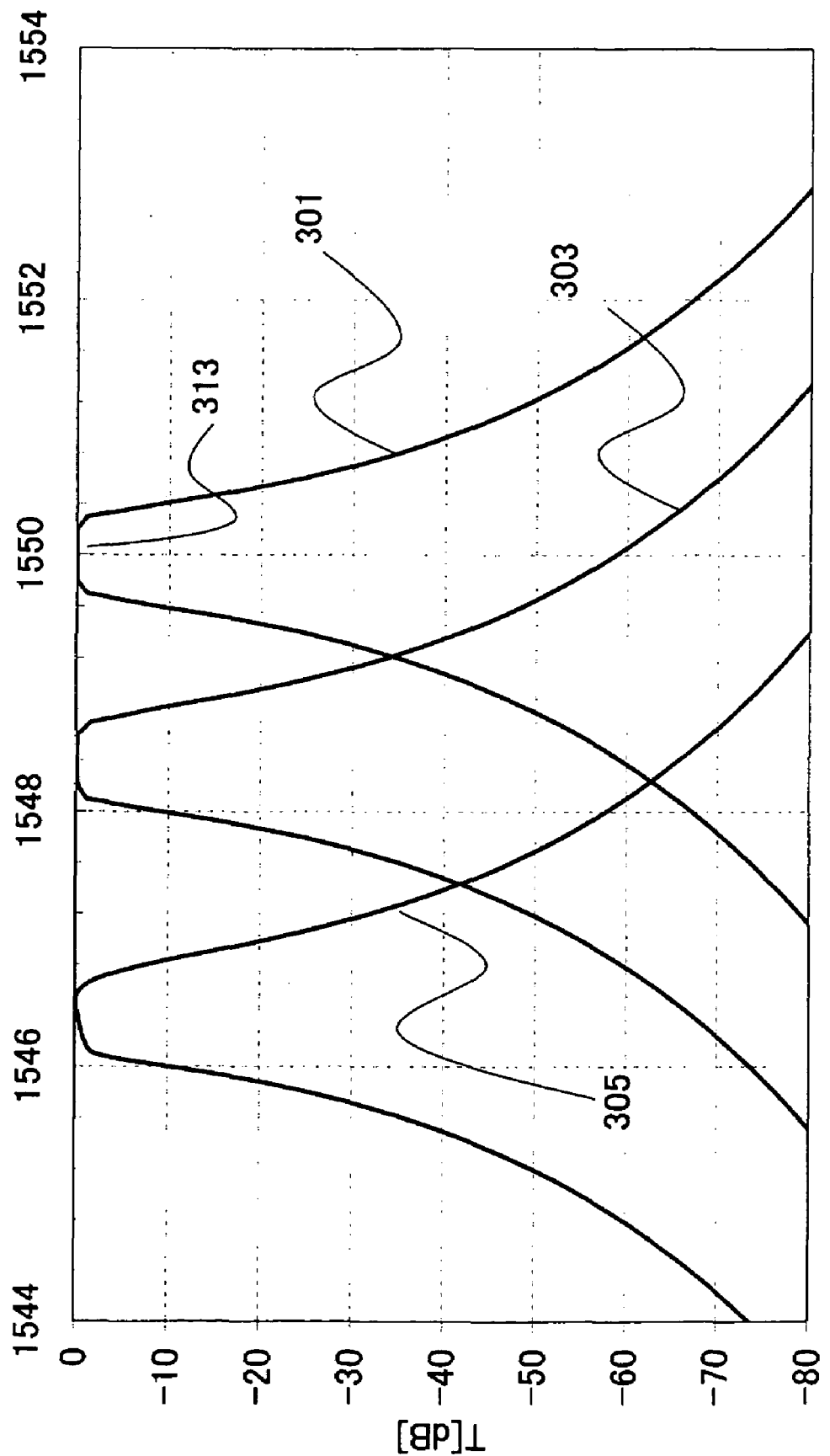
FIG. 3 is a graph showing the transmittance characteristics of the liquid crystal variable wavelength filter unit in the embodiment of the present invention.
Figure 22:
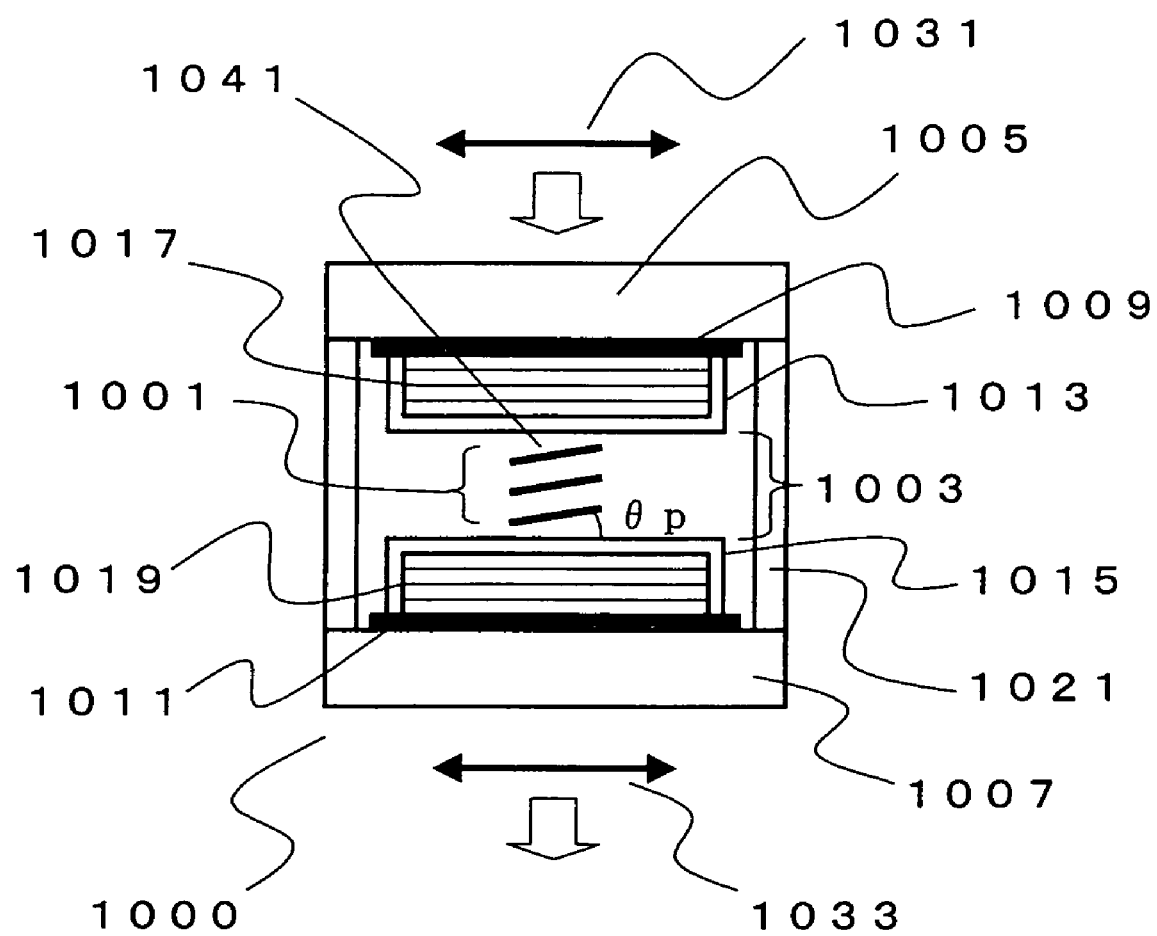
FIG. 22 is a schematic cross sectional diagram showing the basic structure of a liquid crystal variable wavelength filter unit in the prior art.
Figure 23:
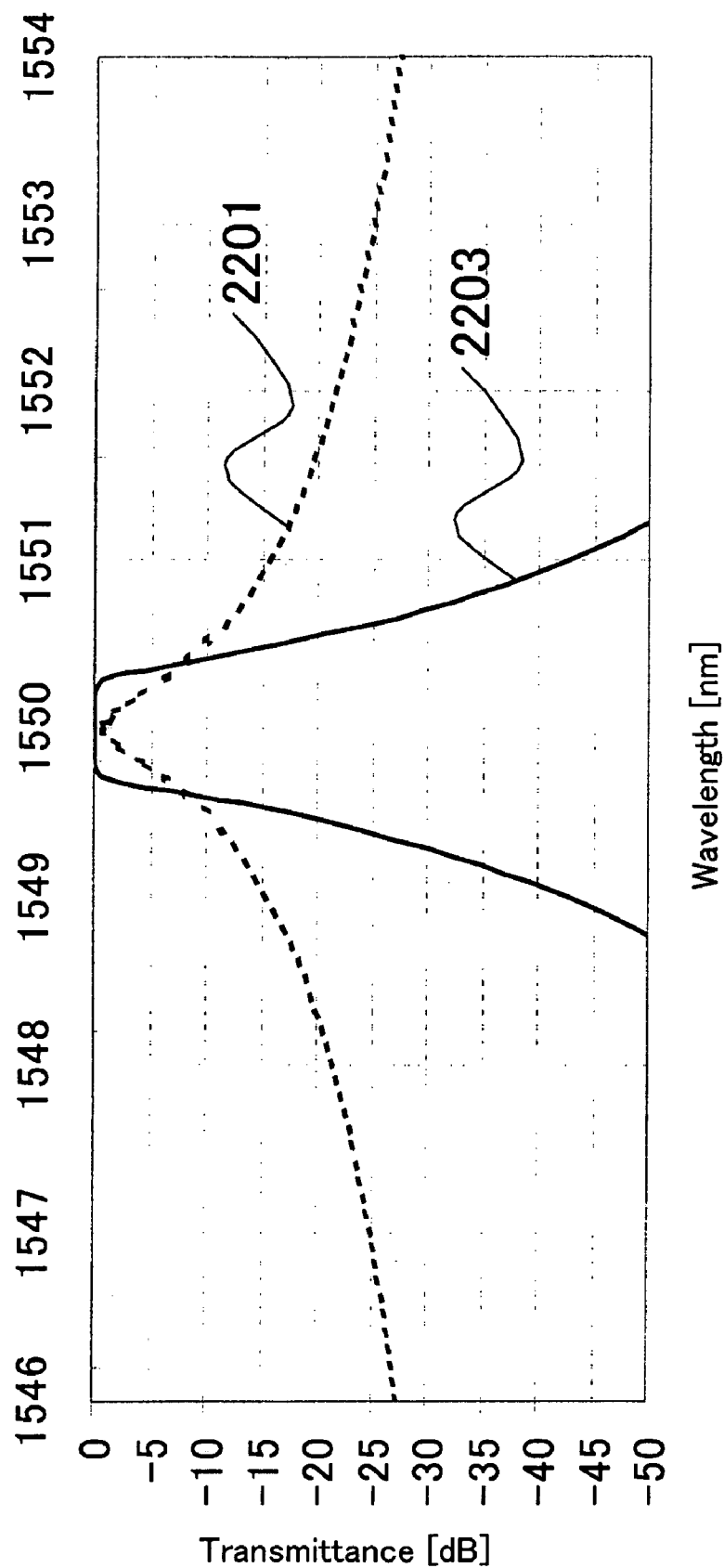
FIG. 23 is a characteristic diagram showing the comparison between the transmittance characteristic of the liquid crystal variable wavelength filter unit in the prior art and the ideal characteristic.

Next, FIG. 3 shows the transmittance characteristics graph of the liquid crystal variable wavelength filter unit 130 when the incident angle β of the band pass filter 111 is changed by the first liquid crystal beam deflector 101. When the incident angle β is 0 degree, a first transmission curve 301 of the band pass filter 111 has flat top characteristics 313 in the vicinity of 1550 nm. When considering the graph based on the incident angle β of the band pass filter 111, the curve becomes a second transmission curve 303 when the incident angle β is 4 degrees, and the curve becomes a third transmission curve 305 when the incident angle β is 6 degrees. In this way, in addition to the flat top characteristic, the high isolation characteristic of the stop band, which cannot be implemented by the liquid crystal Fabry-Perot filter 1000 (FIG. 22) in the prior art, can be set close to the ideal characteristic.

Figure 4:
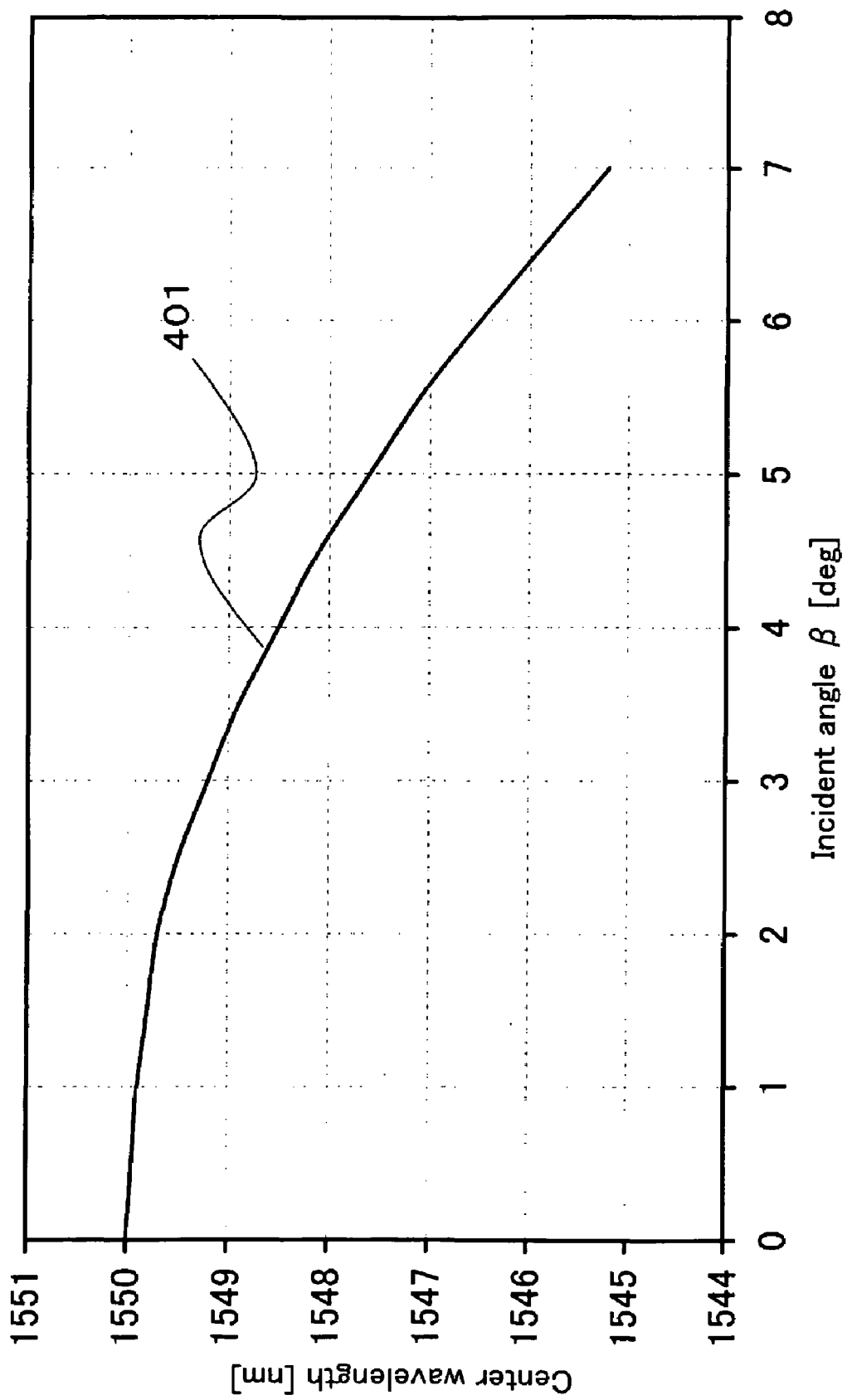
FIG. 4 is a characteristic diagram showing the relation between the center wavelength and the incident angle of the band pass filter of the liquid crystal variable wavelength filter unit in the embodiment of the present invention.

Next, FIG. 4 shows the relation between the incident angle β of the band pass filter 111 shown in FIG. 3 and the center wavelength of the liquid crystal variable wavelength filter unit 130 according to the present invention. The figure indicates that, as the incident angle β becomes larger, the center wavelength of the liquid crystal variable wavelength filter unit 130 shifts to the shorter wave side as shown by incident angle dependency characteristic 401. At this time, the relation between the outgoing angle θ of the first liquid crystal beam deflector 101 and the incident angle β of the band pass filter 111 is as shown below. For example, when the angle α of the first wedge prism 121 is 3 degrees and θmax is also 3 degrees, the relation is as follows.

θ=3 degrees when β=0 degree

θ=0 degree when β=3 degrees

θ=−1 degree when β=4 degrees

θ=−3 degrees when β=6 degrees

That is, by changing the outgoing angle θ of the first liquid crystal beam deflector 101 from 3 degrees to −3 degrees, the incident angle of the band pass filter 111 changes from 0 to 6 degrees and, therefore, the center wavelength can be selected in FIG. 3 from the band 1546.5 nm to 1550 nm. Although the characteristics in FIG. 3 and FIG. 4 are those when the P-polarized light (TM wave) is used as the light of specific deflection components, the S-polarized light (TE wave) also has almost the same characteristics when the incident angle β is 10 degrees or lower.

Next, the structure of the first liquid crystal beam deflector 101 will be described with reference to FIG. 5. Because the structure of the second liquid crystal beam deflector 103 is the same as that of the first liquid crystal beam deflector 101, only the first liquid crystal beam deflector 101 is described in this embodiment.

A nematic liquid crystal layer 501 is homogeneously aligned using alignment layers 217 formed on a composite electrode 211 of a first transparent substrate 201 and on a common electrode 213 of the second transparent substrate 203 of the first liquid crystal beam deflector 101 so that a tilt angle 209 of p-type (positive type) liquid crystal molecule directors 207 becomes 5 degrees or lower when an electric field is applied. For the first liquid crystal beam deflector 101 shown in FIG. 5, an incoming linearly-polarized beam 511 should be composed of components parallel to the page. This incoming linearly-polarized beam 511 is a P-polarized light as viewed from the band pass filter 111 in the subsequent stage.

In the first liquid crystal beam deflector 101, only the P-polarized light, which is one of incoming beam components and which is parallel to the directors 207 of the nematic liquid crystal layer 501, can be phase modulated. Therefore, a specific deflection component included in the incoming beam 151 shown in FIG. 1 is also a P-polarized light when the first liquid crystal beam deflector 101 shown in the configuration in FIG. 1 is used.

Figure 5:
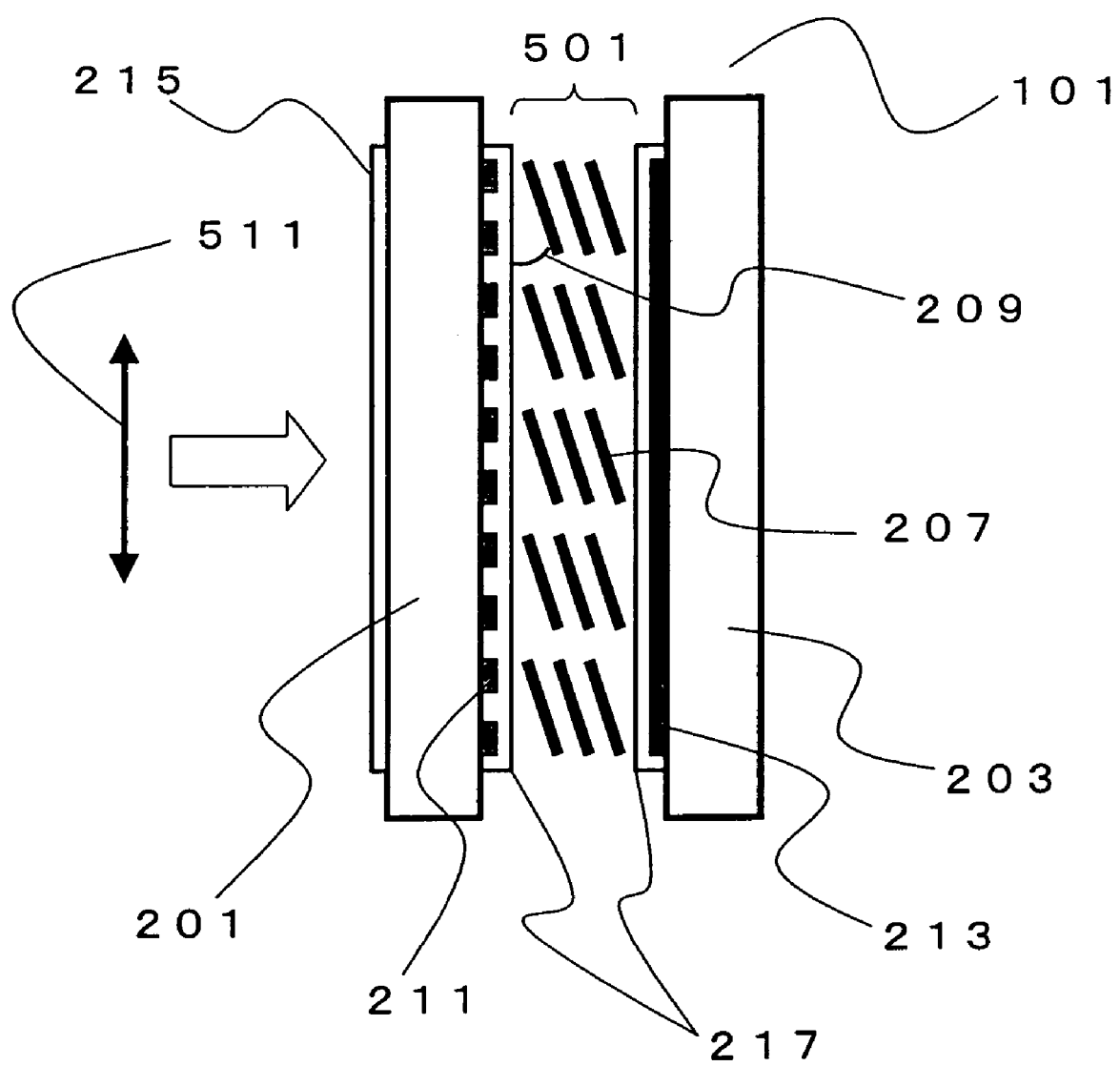
FIG. 5 is a cross sectional diagram of a liquid crystal beam deflector when a light is a P-polarized light when viewed from the band pass filter in the embodiment of the present invention.

Although not shown in FIG. 5, the first transparent substrate 201 and the second transparent substrate 203 are fixed by a spacer so that the nematic liquid crystal layer 501 retains a predetermined thickness from several μm to several-score μm. Although not shown in FIG. 5, a transparent insulating film of tantalum pentoxide ($Ta_2O_5$) or silicon dioxide ($SiO_2$) may also be formed on the composite electrode 211 or common electrode 213 or on both to prevent a short between the composite electrode 211 and the common electrode 213. It is also desirable to increase the transmittance by using a dielectric multi-layered film, composed of a high refractive film and a low refractive film, as the transparent insulating film. The common electrode 213 formed on the second transparent substrate 203 may be a full-area electrode composed of a transparent conductive film. The structure of the composite electrode 211 will be described later.

When indium tin oxide (ITO) is used for a transparent conductive film forming the optical path part of the composite electrode 211 and forming the common electrode 213, it is desirable that this transparent conductive film be 50 nm or thinner and, in addition, a high-oxygen-concentration film with a sheet resistance of several-hundred Ω to 1 kΩ be used when the film is formed in order to increase the transmittance in the near infrared area of 1.3 μm to 1.6 μm.

In addition to ITO, a thin film of indium oxide ($In_2O_3$), tin oxide ($SnO_2$), or zinc oxide (ZnO) can be used as the transparent conductive film. In this case, it is also desirable to use a film with a thickness of 50 nm or thinner and with a sheet resistance of several-hundred Ω to 1 k Ω.

In addition, a non-reflective coating 215 is formed as necessary on the surface, which is opposite to the nematic liquid crystal layer 501 and which contacts the air layer, of the glass-fabricated first transparent substrate 201 or second transparent substrate 203 to prevent a reflection on the boundary between air and the transparent substrate. As the non-reflective coating 215, a coating layer composed of a dielectric multi-layered film made of materials such as tantalum pentoxide ($Ta_2O_5$) or silicon dioxide ($SiO_2$) can be used.

Figure 6:
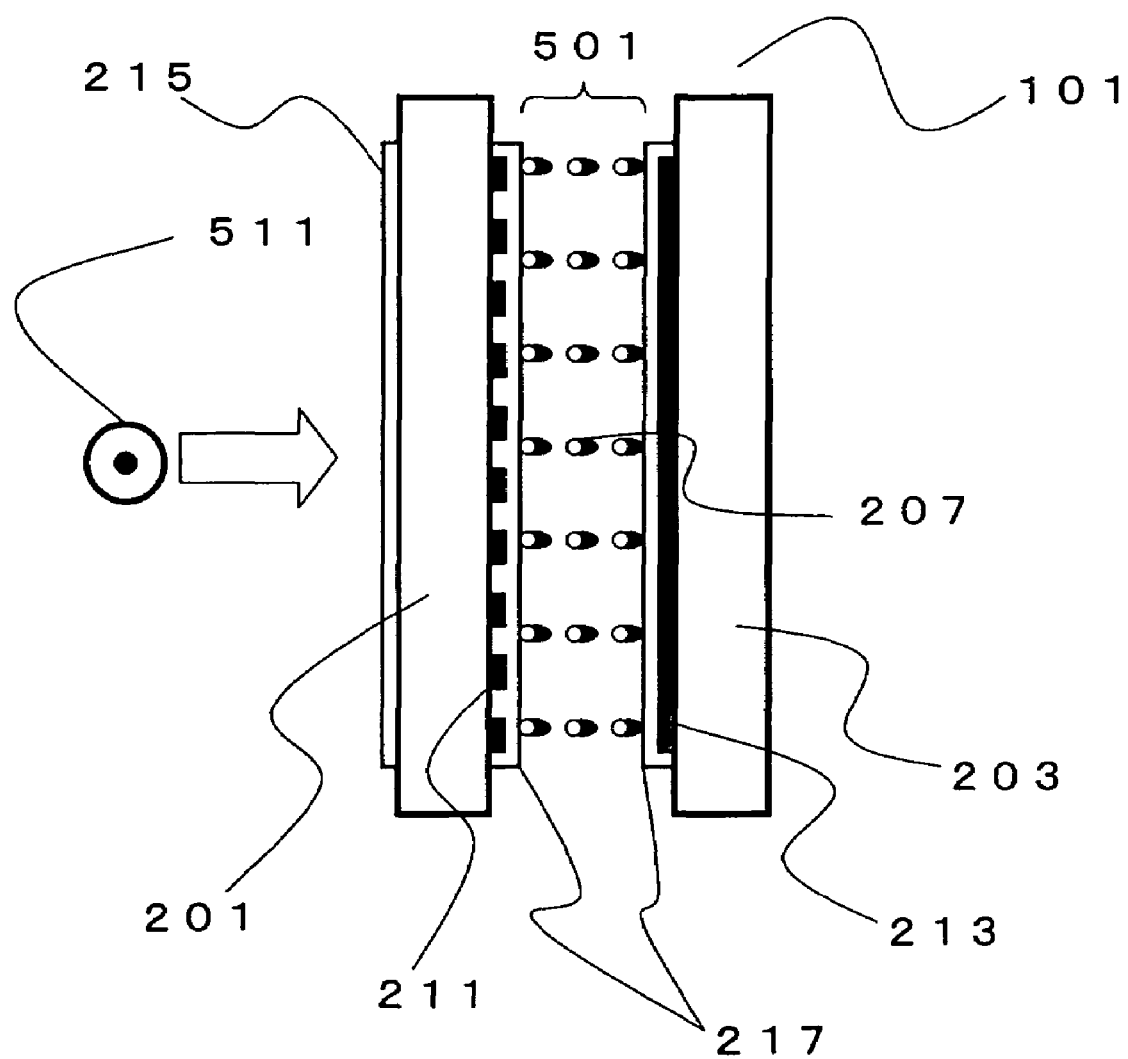
FIG. 6 is a cross sectional diagram of the liquid crystal beam deflector when a light is an S-polarized light when viewed from the band pass filter in the embodiment of the present invention.

The incoming beam 151 in FIG. 1 or the incoming linearly-polarized beam 511 in FIG. 5 typically shows the configuration when the light is a P-polarized light as viewed from the band pass filter 111 in the subsequent stage. FIG. 6 shows the configuration of the liquid crystal beam deflector 101 when the incoming linearly-polarized beam 511 is an S-polarized light as viewed from the band pass filter 111 in the subsequent stage. The configuration in FIG. 6 is similar to that in FIG. 5 except that the direction of the directors 207 in the nematic liquid crystal layer 501 are made parallel to the S-polarized light of the incoming linearly-polarized beam 511. The configuration of the liquid crystal beam deflector for the P-polarized light and the S-polarized light can be determined according to the specifications and the use.

Figure 7:
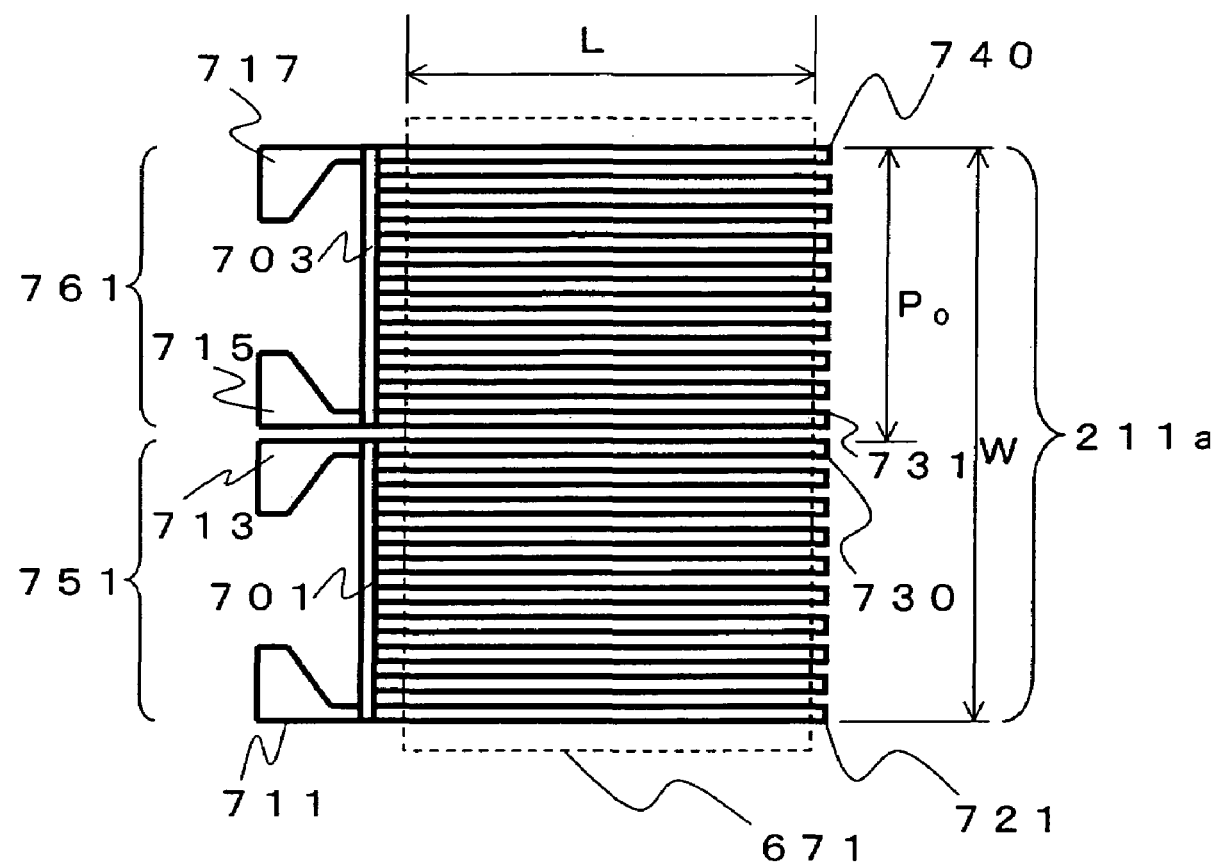
FIG. 7 is a schematic top view showing the structure of a first composite electrode of the liquid crystal beam deflector in the embodiment of the present invention.

Next, the structure of the first composite electrode for forming a blazed diffraction grating of the first liquid crystal beam deflector 101 will be described in detail with reference to FIG. 7. FIG. 7 is a top view of a first composite electrode 211a. The first composite electrode 211a comprises two diffraction grating areas, including a first element grating 751 and a second element grating 761, in a first active area 671.

Referring to FIG. 7, the first element grating 751 comprises electrodes from a first individual electrode 721 to an Nth individual electrode 730. The second element grating 761 comprises electrodes from an (N+1)th individual electrode 731 to a 2Nth individual electrode 740. For simplicity, N is set to 10 in the first composite electrode 211a for convenience. The first electrodes from the first individual electrode 721 to the 2Nth individual electrode 740 are formed by transparent conductive films made of materials such as ITO with the film thickness and the resistance value described above.

The electrodes from the first individual electrode 721 to the 2Nth individual electrode 740 are grouped into a plurality of groups outside the first active area 671, and the individual electrodes in each group are connected by a common collector electrode made of the same material as that of individual electrodes such as ITO. FIG. 7 shows an example in which the electrodes are grouped into two. In FIG. 7, the electrodes from the first individual electrode 721 to the Nth individual electrode 730 are connected by a first collector electrode 701 outside the first active area 671, and the electrodes from the (N+1)th individual electrode 731 to the 2Nth individual electrode 740 are similarly connected by a second collector electrode 703 outside the first active area 671. In addition, a first signal electrode 711 and a second signal electrode 713, each of which is made of a low-resistance metal material such as an Mo and Ag alloy, are connected to the ends of the first collector electrode 701, and a third signal electrode 715 and a fourth signal electrode 717 are connected to the ends of the second collector electrode 703. The collector electrode described above need not be a film with a sheet resistance of several-hundred to 1 k Ω but may be a film with a thinner film thickness or may be a film with a narrower electrode width and with a linear resistance in the longer side of the electrode.

Although FIG. 7 shows only two diffraction grating areas, that is, first element grating 751 and second element grating 761, for convenience, a predetermined number of element gratings must be formed in the first active area 671 of the actual first liquid crystal beam deflector 101 according to the incoming beam diameter. As an example, the following describes an actual design example in which an incoming beam in the 1550 nm band is used as the incoming beam assuming that the light is sent by a collimator from a single-mode optical fiber to the first active area 671 as a parallel light. At this time, if the Gaussian beam diameter of the parallel light is 300 μm, the width L of the first active area ranges from 400 μm to 1.5 mm. It is also desirable that a plurality of individual electrodes of each element grating be a 2 μm or lower line-and-space considering the wavelength of the incoming beam and that the width W of the first composite electrode 211a be about 800 μm to 2 mm when the pitch P0 of the element grating is from 50 μm to 100 μm. Therefore, when the pitch P0 is 50 μm, the number of element gratings is from 16 to 40 and, when the pitch P0 is 100 μm, the number of element gratings is 8 to 20. It should be noted that the width W of the first composite electrode 211a must be determined according to a shift in the beam, because the width is shifted by Du when the beam deflection angle of the outgoing light is +θ, and by Dd when the beam deflection angle of the outgoing light is −θ, from the width when the beam is not deflected (θ is 0 degree), as shown in FIG. 1.

As apparent from the above description, even when one diffraction grating area has N individual electrodes in the first liquid crystal beam deflector 101 that forms a blazed diffraction grating, the number of signal electrodes connected to the control signal from the driving circuit is only 2M for the number of element gratings (M) because a pair of signal electrodes is connected to both ends of the collector electrode. This configuration is advantageous in that the number of signal electrodes is significantly reduced especially when the number of individual electrodes is increased.

Figure 11:
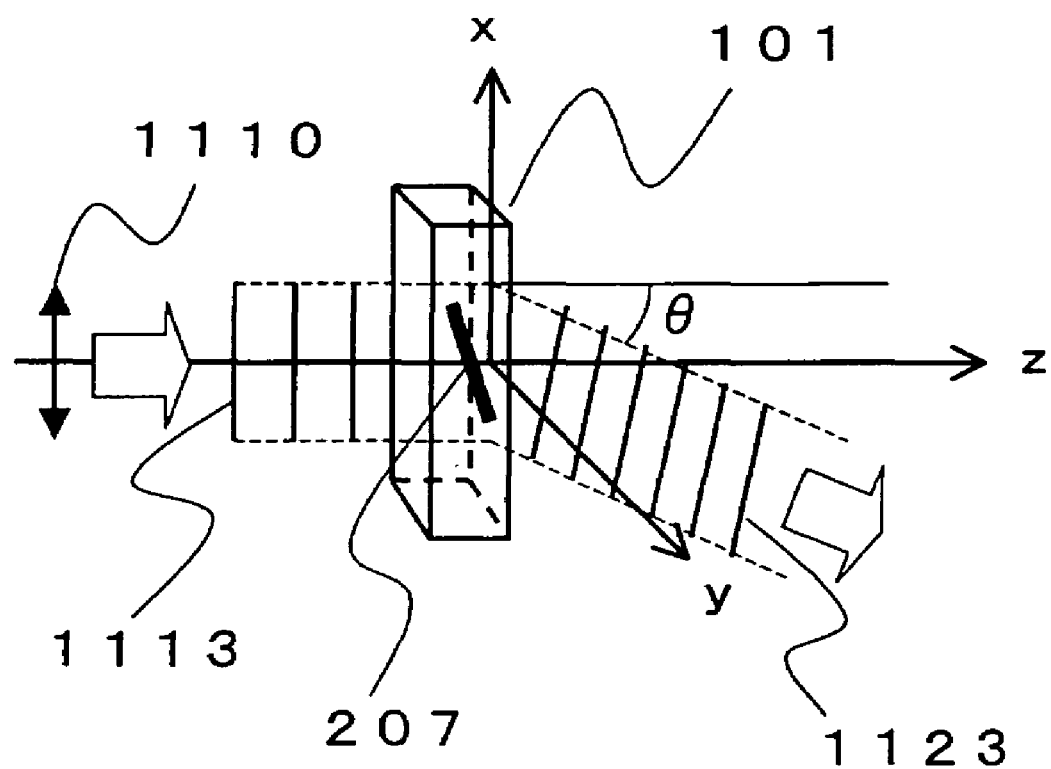
FIG. 11 is a schematic diagram showing the basic principle of the liquid crystal beam deflector in the embodiment of the present invention.

Next, the operation of the first liquid crystal beam deflector 101 will be described with reference to FIG. 11. Referring to the figure, the liquid crystal beam deflector 101 aligns the p-type (positive type) nematic liquid crystal so that the longer axis direction of the directors becomes parallel to the direction of electric field when an external electric field is applied with the directors 207 homogeneously aligned in parallel in the x-z plane. Assume that a linearly polarized light 1110, which vibrates in the direction parallel to the x-axis, enters the liquid crystal beam deflector 101 in the z-axis direction. Before entering the liquid crystal beam deflector 101, the incoming wave front 1113 of the light is a plane surface. When an electric field is applied to the liquid crystal beam deflector 101 to control the in-plane distribution of the directors so that a predetermined refractive index distribution is obtained, the incoming wave front 1113 can be converted to an outgoing wave front 1123 that is a plane wave deflected by a predetermined angle of θ.

Figure 12:
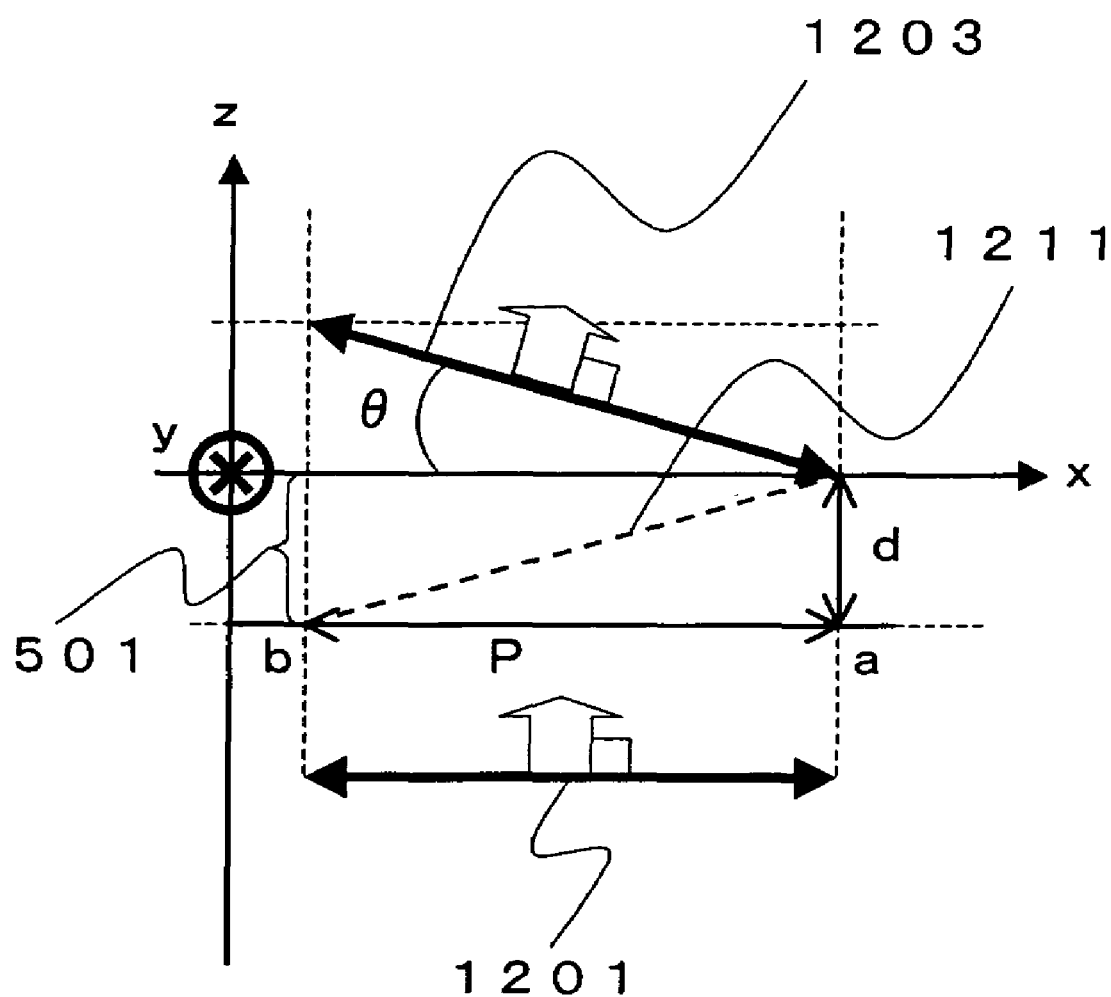
FIG. 12 is a cross sectional diagram showing the principle of operation of the liquid crystal beam deflector in the embodiment of the present invention.

The following describes this phenomenon more in detail with reference to FIG. 12. With the outgoing side plane of the nematic liquid crystal layer 501 of the liquid crystal beam deflector 101 as the x-y plane, the liquid crystal is aligned parallel to the x-z plane. At this time, an incoming linearly polarized beam 1201 vertically enters the nematic liquid crystal layer 501. In this nematic liquid crystal layer 501, an operation point is predetermined so that a distribution 1211 of extraordinary refractive indexes ne(x), each of which is the function of position x, linearly changes in the range a–b that is the element grating pitch P. Because the thickness d of nematic liquid crystal layer 501 is fixed but the refractive index ne(x) changes linearly in the pitch P, the incoming linearly polarized beam 1201 that propagates through the nematic liquid crystal layer 501 is affected by the modulation of a retardation Δn(x)·d that varies according to the position. Let n0 be the ordinary refractive index of the liquid crystal Then, $$\Delta n(x) = ne(x) - n0 \quad (3)$$

When propagating through the nematic liquid crystal, that is, through a dielectric medium, the incoming linearly polarized beam 1201 propagates slowly where the retardation is high and, conversely, quickly where the retardation is low. Therefore, the wave front of an outgoing linearly polarized light 1203 that comes out from the nematic liquid crystal layer 501 is inclined by the amount $$\tan \theta = \delta \Delta n \cdot d / P \quad (4)$$

where δΔn is the value of the difference in the retardation Δn(x) between point a and point b using the following equation.

$$\delta \Delta n = \Delta n(a) - \Delta n(b) \quad (5)$$

As described above, if the distribution 1211 of the extraordinary refractive indexes ne(x) in the nematic liquid crystal layer 501 of the liquid crystal beam deflector is linear, the wave front of the outgoing linearly polarized light 1203 is a plane surface as with the incoming linearly polarized beam 1201 and, as a result, the outgoing linearly polarized light 1203 can be deflected by θ with respect to the incoming linearly polarized beam 1201.

Figure 13:
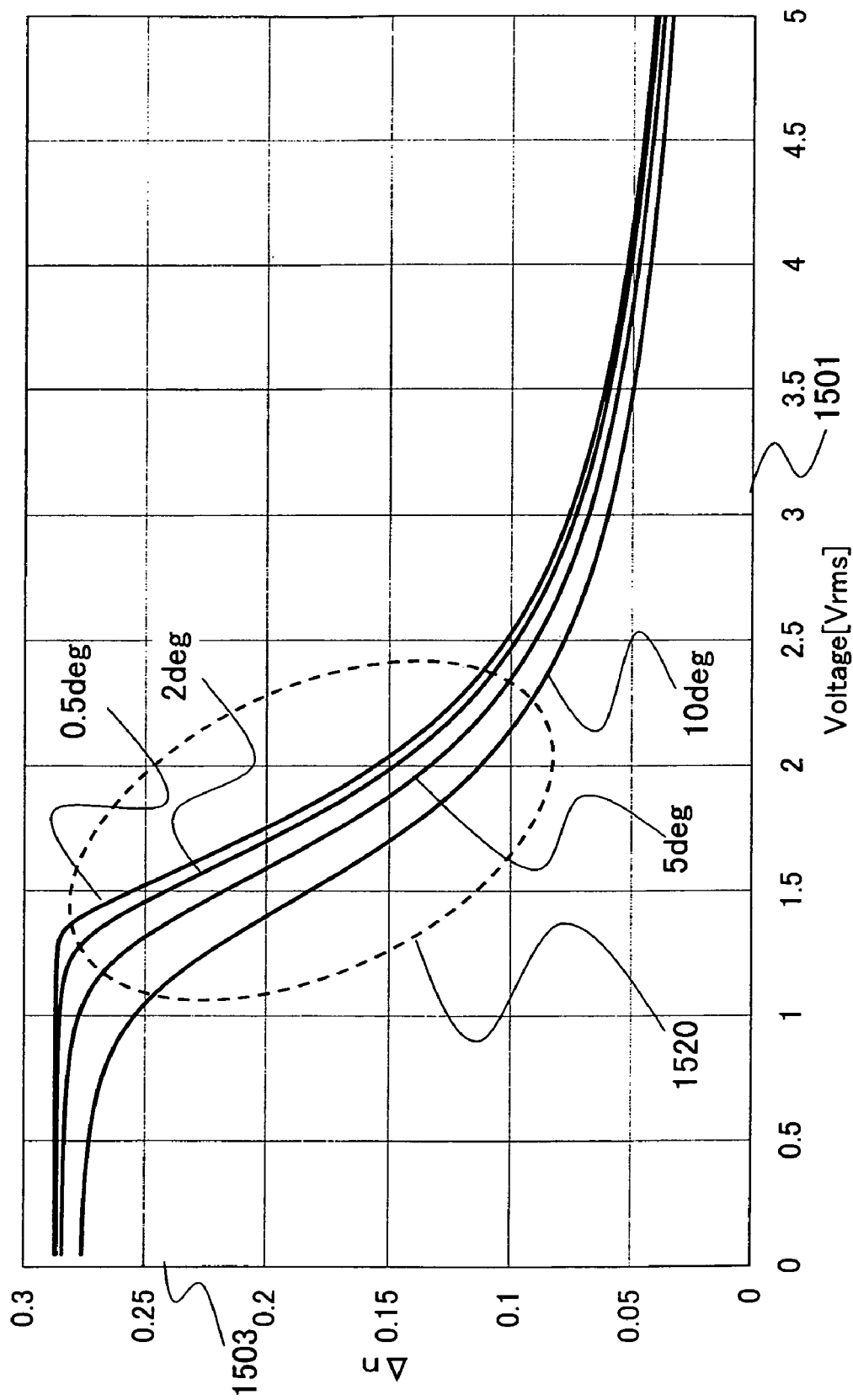
FIG. 13 is a graph showing the relation between the liquid crystal element voltage and effective birefringence characteristic in the embodiment of the present invention.

Now, let's consider the condition for linearly approximating the extraordinary refractive index ne(x) of the nematic liquid crystal layer 501 used in the present invention. An incoming linearly polarized beam is affected by a modulation determined by the "applied voltage-effective birefringence characteristic" such as the one shown in FIG. 13. In FIG. 13, the horizontal axis indicates the effective value of the voltage applied to the nematic liquid crystal layer 501, and the vertical axis indicates the effective birefringence Δn. The shape of an electro-optic response curve is determined by parameters such as the elastic constant of the liquid crystal that is used, dielectric constant anisotropy characteristic, and pre-tilt angle determined by the alignment film layer when no electric field is applied. This "applied voltage-effective birefringence characteristic" is that of the nematic liquid crystal material BL007 (product name) from Merck & Co. Inc. The characteristic is a theoretical curve obtained assuming that Δnmax=0.287 and the liquid crystal layer thickness is 20 μm. In FIG. 13, the horizontal axis indicates an applied voltage 1501 applied to homogeneously aligned cells, and the vertical axis indicates the effective birefringence Δn 1503 of the liquid crystal molecules. FIG. 13 shows the characteristic when the pre-tilt angle is 0.5 degree, 2 degrees, 5 degrees, and 10 degrees. For use as the liquid crystal beam deflector 101 with the first composite electrode 211a, it is necessary to use an area near a linear area 1520 that can approximate a liner curve in order to perform the operation described in FIG. 12. This indicates that the pre-tilt angle of the nematic liquid crystal should be 5 degrees or lower or, preferably, 2 degrees or lower, in order to make the linear area 1520 wide.

Figure 14:
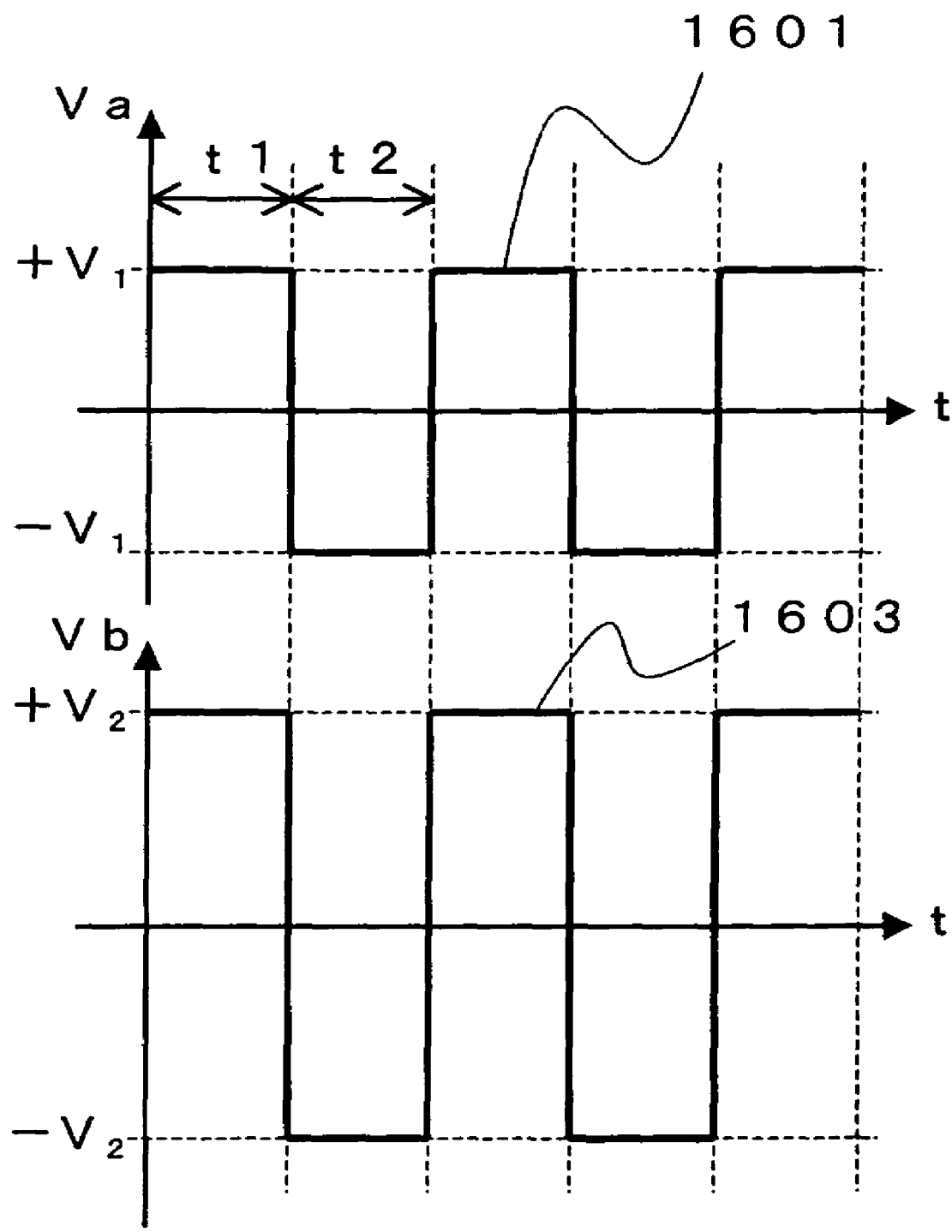
FIG. 14 is a schematic diagram showing a drive waveform of the liquid crystal variable wavelength filter unit in the embodiment of the present invention.

Next, the following describes the driving method of the liquid crystal beam deflector 101, which has the first composite electrode 211a, and the potential gradient generation in the collector electrode. First, the part of the first element grating 751 will be described. FIG. 14 shows the drive waveform. A first drive waveform 1601 is applied to the first signal electrode 711, and a second drive waveform 1603 is applied to the second signal electrode 713. The first drive waveform 1601 and the second drive waveform 1603 have the same frequency and the same phase but different voltages; the voltage of the second drive waveform 1603 higher than that of the first drive waveform 1601. In period t1, the first drive waveform 1601 is +V1[V] and the second drive waveform 1603 is +V2[V]. Here, the common electrode 213 is 0[V]. The first collector electrode 701, formed by a linear resistance material such as a transparent conductive film, divides the applied voltage to form a linear potential distribution. Therefore, the potential, which is obtained by linearly dividing the voltage applied to the first signal electrode 711 and the voltage applied to the second signal electrode 713, is applied to the plurality of individual electrodes in the first element grating 751 formed in the first active area 671.

In this case, the longer side of each individual electrode has almost the same potential because the individual electrode is formed by a material with a lower resistance than the impedance of the nematic liquid crystal layer 501. In addition, the period, during which the bias ac voltage is applied to the common electrode, may be divided as necessary into period 1 and period 2.

Figure 15:
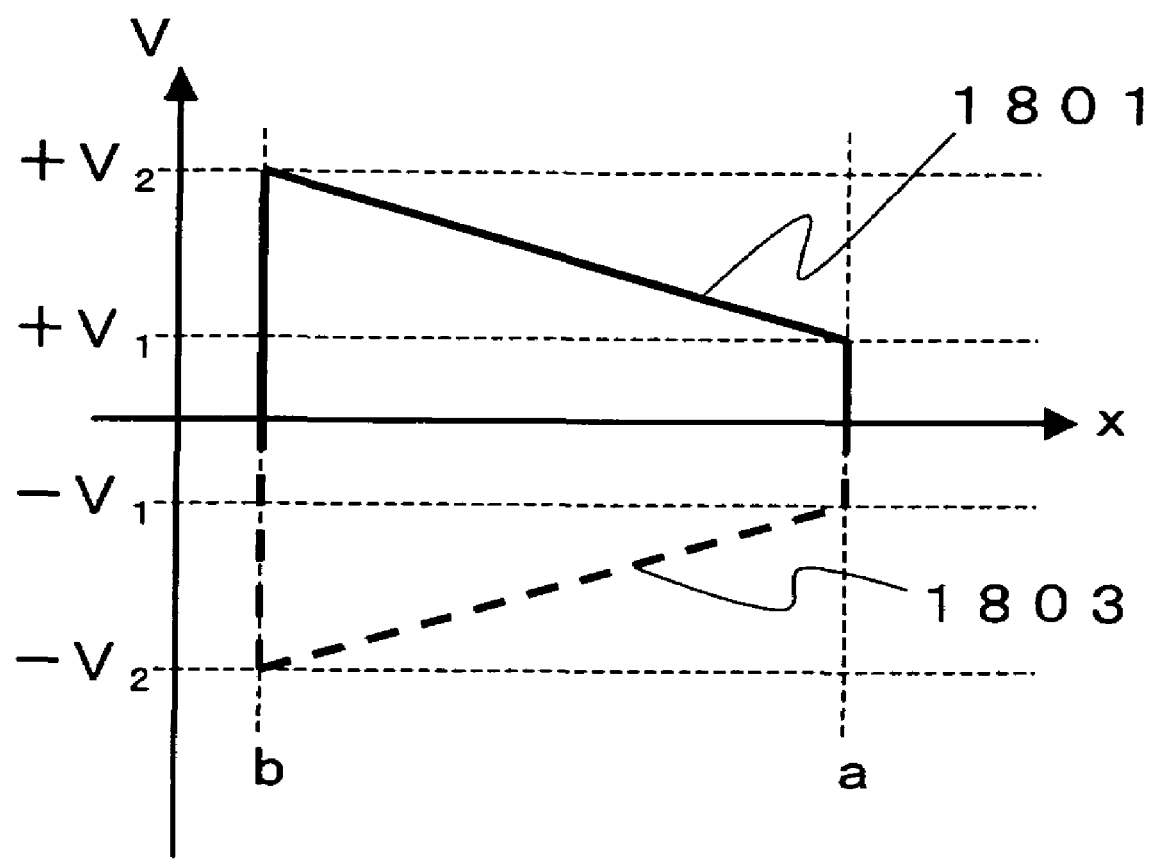
FIG. 15 is a diagram showing the potential distribution of the liquid crystal beam deflector in the embodiment of the present invention.

Next, the relation between the potential gradient of the collector electrode 701 in the first composite electrode 211a (FIG. 7) and the potential of individual electrodes will be described more in detail. In period t1 shown in FIG. 14, the potential distribution of the first collector electrode 701 that connects the first signal electrode 711 and the second signal electrode 713 is the linear potential distribution indicated by a first potential distribution 1801 in FIG. 15 as described above. In period t2 shown in FIG. 14, the potential distribution of the first collector electrode 701 is a second potential distribution 1803 in FIG. 15. Point a in FIG. 15 corresponds to the position of the individual electrode connected to the first signal electrode 711, and point b corresponds to the position of the individual electrode connected to the second signal electrode 713. When the drive waveform shown in FIG. 14 is a square wave with the 50% duty ratio, the first and second potential distributions 1801 and 1803 shown in FIG. 15 are repeated alternately as the time goes on. Therefore, the voltage applied to the nematic liquid crystal layer 501 via the common electrode 213, which is maintained at 0[V], is an alternating voltage at any individual electrode with no DC component added to the nematic liquid crystal layer 501. Because the response of the nematic liquid crystal is an effective value response, it can be considered that the effective value of V1[V] is always applied to the first signal electrode 711, the voltage V2[V] is applied to the second signal electrode 713, and the potential divided by the first collector electrode 701 is applied to the individual electrodes.

Figure 16:
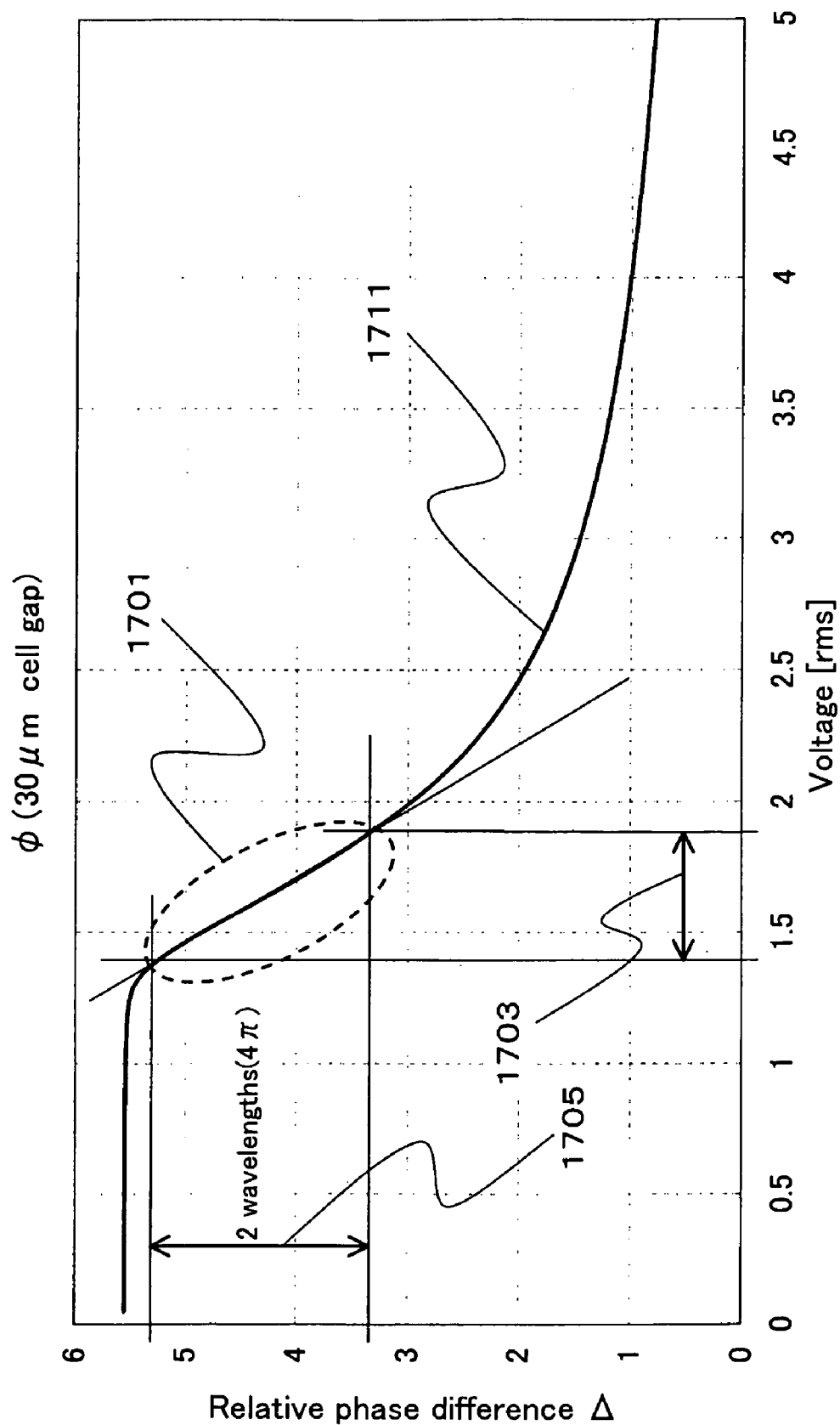
FIG. 16 is a graph showing the relation between the liquid crystal element voltage and relative phase difference characteristic in the embodiment of the present invention.

Next, the phase distribution generated in the collector electrode will be described. FIG. 16 is a graph showing the relation between the voltage [Vrms] applied to the liquid crystal and the relative phase difference Δ when BL007 (Merck Japan LTD., product name) is used as the liquid crystal and the pre-tilt angle is set to 1 degree. A characteristic curve 1711 indicates that there is a linear approximation area 1701 in the vicinity of 1.5–2[V]. Consider the phase distribution when the liquid crystal layer thickness is 30 [μm] and the wavelength λ is 1550 [nm]. When the effective birefringence is Δn, the relative phase difference Δ is defined as follows:

$$\Delta = \Delta n \cdot d / \lambda \quad (6)$$

The relative phase difference Δ in FIG. 16 indicates that, when λ=1550 nm, the relative phase difference in the linear approximation area 1701 is 2 wavelengths or more in terms of λ, or about 4π in phase, in a linear variable modulation range 1705. In this way, the extraordinary refractive index can be linearly approximated by the pre-tilt angle and, at the same time, when a voltage is applied within an operation voltage range 1703 in which the operation can be performed in the linear approximation area 1701 in the range defined by the pre-tilt angle, the phase distribution proportional to the positions of individual electrodes can be implemented in the first active area 671 of the first composite electrode 211a.

Figure 17:
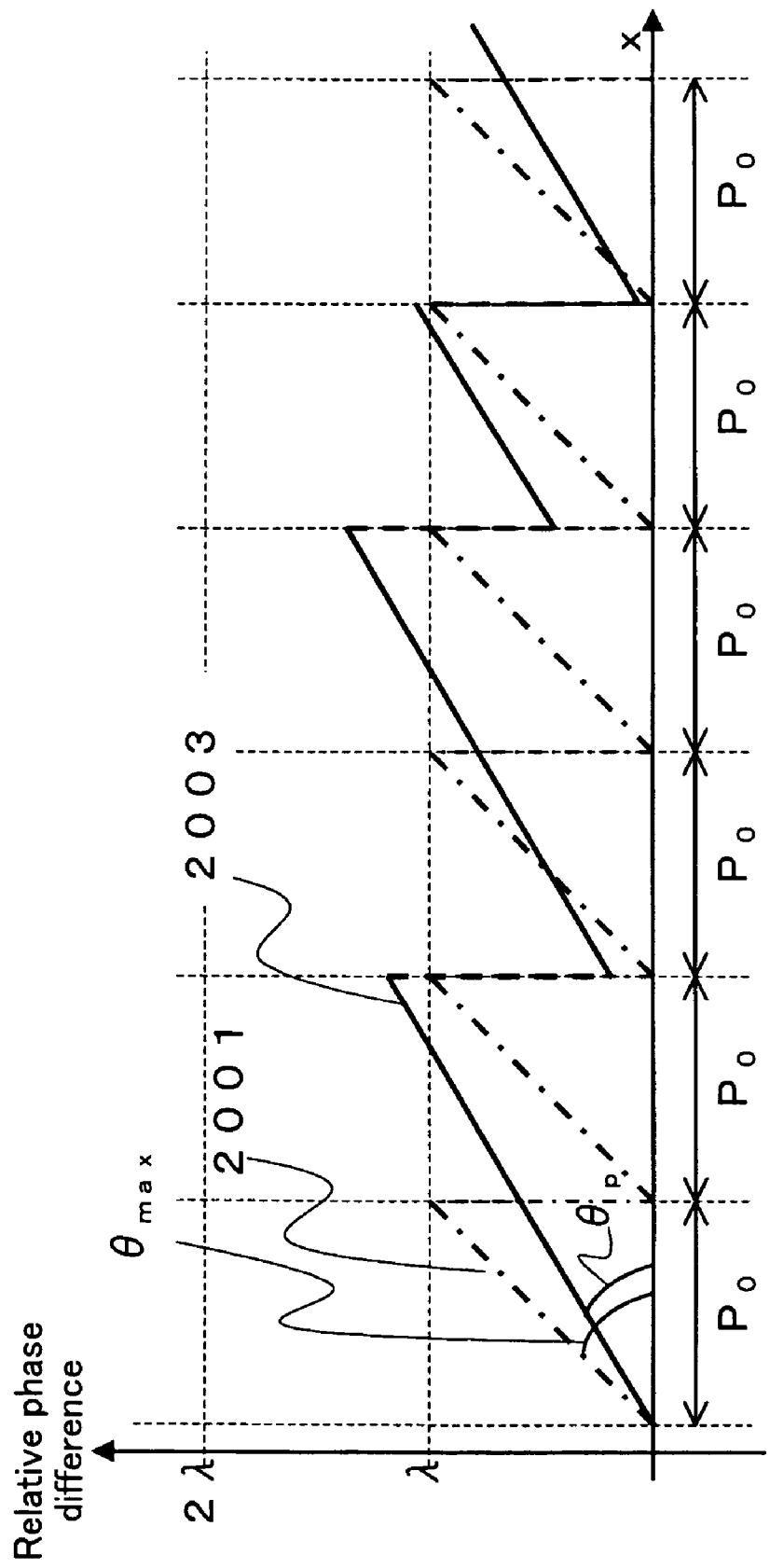
FIG. 17 is a schematic diagram showing the relation between the composite electrode position and the phase distribution of the liquid crystal beam deflector in the embodiment of the present invention.

Next, an actual method of creating any deflection angle via the liquid crystal beam deflector 101, which has the first composite electrode 211a, using the driving method described above will be described with reference to FIG. 17. In this case, the element grating pitch is P0, and the maximum deflection angle θmax is defined as follows.

$$\tan \theta_{max} = \lambda / P0 \quad (7)$$

The maximum phase modulation amount of a phase modulation curve 2001 at θmax is one wavelength, or 2π, for the element grating pitch P0. Because the positions of the first and second signal electrodes are predetermined for the first composite electrode 211a, it is impossible to adjust the phase by resetting the phase by 2π at any electrode position in order to change the phase. Therefore, in order to reset the phase at a predetermined position, it is first necessary to reset the phase for a phase modulation curve 2003 with an angle of θp, between λ–2λ, to deflect an angle θp slightly smaller than θmax without generating a high-order light. In this way, to enable a light of specific components to have a predetermined deflection angle using the first composite electrode 211a, it is necessary to use a driving method that resets the phase for the element gratings which are included in the predetermined element gratings and each of which has a phase modulation equal to or higher than λ and less than 2λ.

Figure 18:
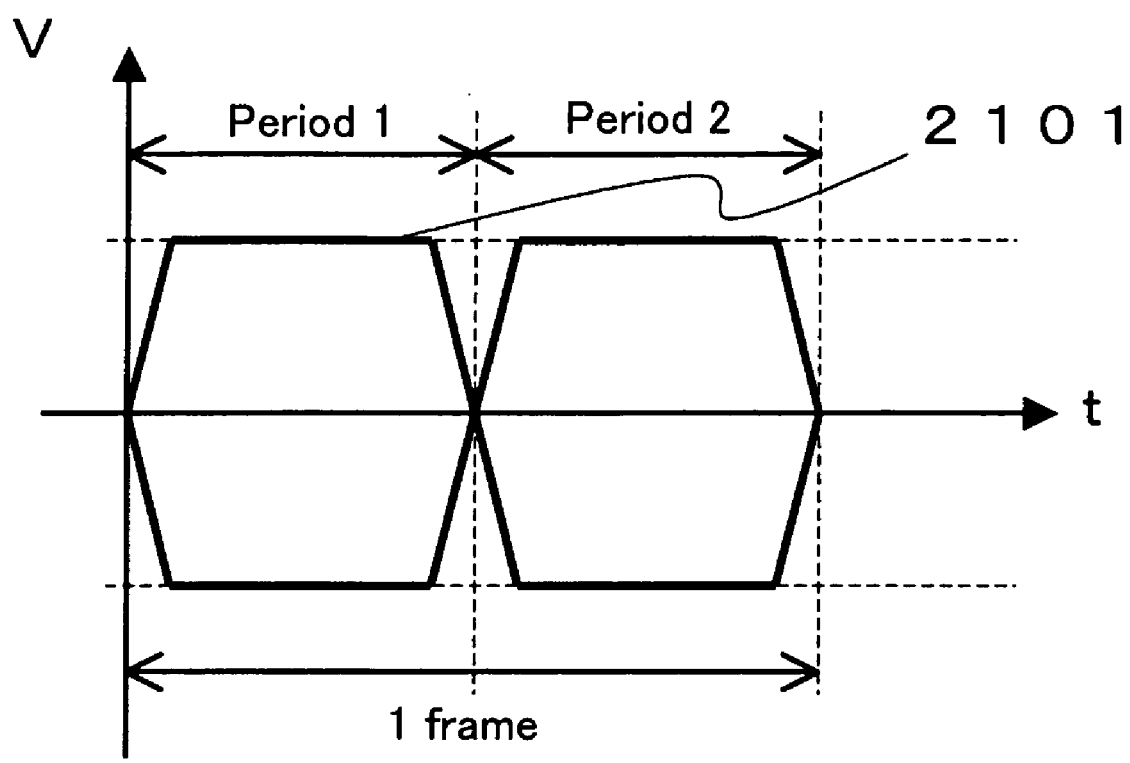
FIG. 18 is a schematic diagram showing another drive waveform of the liquid crystal variable wavelength filter unit in the embodiment of the present invention.

Next, another method for driving the liquid crystal beam deflector 101 that has the first composite electrode 211a will be described. FIG. 18 is a diagram showing the periods in which the waveform is applied to the signal electrode terminals provided on one element grating. In this driving method, one frame is divided into period 1 and period 2. More specifically, the liquid crystal beam deflector 101 is driven alternately in period 1 and period 2; in period 1, an alternating voltage drive signal 2101, which makes the average 0 to prevent the deterioration of the nematic liquid crystal layer 501, is applied to the first signal electrode 711 and the second signal electrode 713 is set to 0[V] that is the same potential as that of the common electrode 213 and, in period 2, the alternating voltage drive signal 2101 is applied to the second signal electrode 713 and the first signal electrode 711 is set to 0[V] that is the same potential as that of the common electrode 213. By using such a driving method, the liquid crystal potential distribution generated in a one-frame element grating, composed of period 1 and period 2, becomes the sum of the effective values of the periods. The waveform applied in period 1 and period 2 may be any waveform; for example, two waveforms with different voltages may be applied. A waveform whose effective value is controlled through pulse-width modulation may also be used. In addition to period 1 and period 2, a period in which a bias AC voltage is applied to the common electrode may also be separately provided as necessary.

Figure 8:
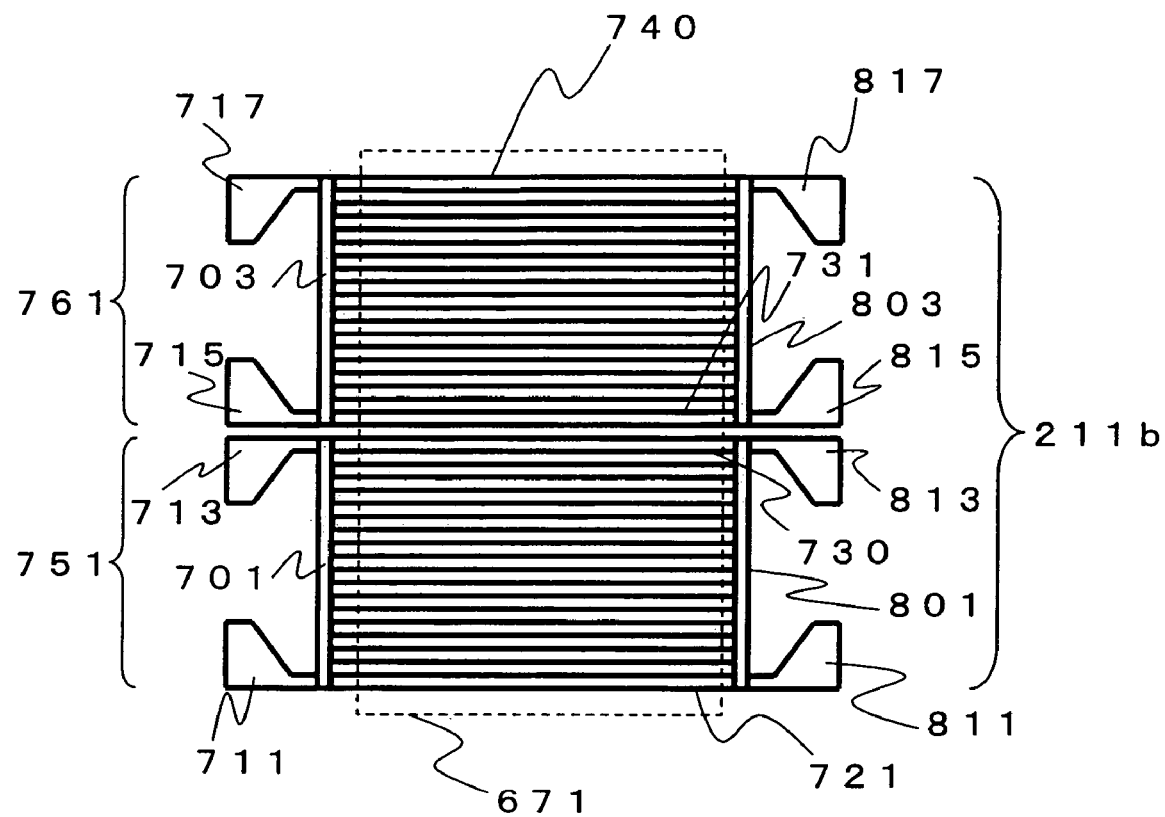
FIG. 8 is a schematic top view showing the structure of a second composite electrode of the liquid crystal beam deflector in the embodiment of the present invention.

Next, another structure of the composite electrode 211 for forming a blazed diffraction grating will be described in detail with reference to FIG. 8. In addition to the structure of the first composite electrode 211a (FIG. 7) described above, a second composite electrode 211b has collector electrodes on both ends of a plurality of individual electrodes outside the first active area 671. Referring to FIG. 8, a third collector electrode 801 is provided outside the first active area 671 at a position opposite to the first collector electrode across the individual electrodes, and a fourth collector electrode 803 is provided at a position opposite to the second collector electrode 703 across the individual electrodes. In addition, the third collector electrode 801 is connected to a fifth signal electrode 811 and a sixth signal electrode 813 made of a low-resistance metal material such as an Mo or Ag alloy, and the fourth collector electrode 803 is connected to a seventh signal electrode 815 and an eighth signal electrode 817.

In this second composite electrode structure, the paired electrodes, that is, the first signal electrode 711 and the fifth signal electrode 811, the second signal electrode 713 and the sixth signal electrode 813, the third signal electrode 715 and the seventh signal electrode 815, and fourth signal electrode 717 and the eighth signal electrode 817, are shorted outside the first active area. The driving method described above can be used directly for driving the liquid crystal beam deflector that has the second composite electrode 211b.

The structure of the second composite electrode 211b for forming the liquid crystal beam deflector shown in FIG. 8 is efficient especially when the impedance of the individual electrodes becomes noticeably higher than that at the driving frequency of the nematic liquid crystal layer, for example, when the individual electrodes become thinner or longer.

Figure 9:
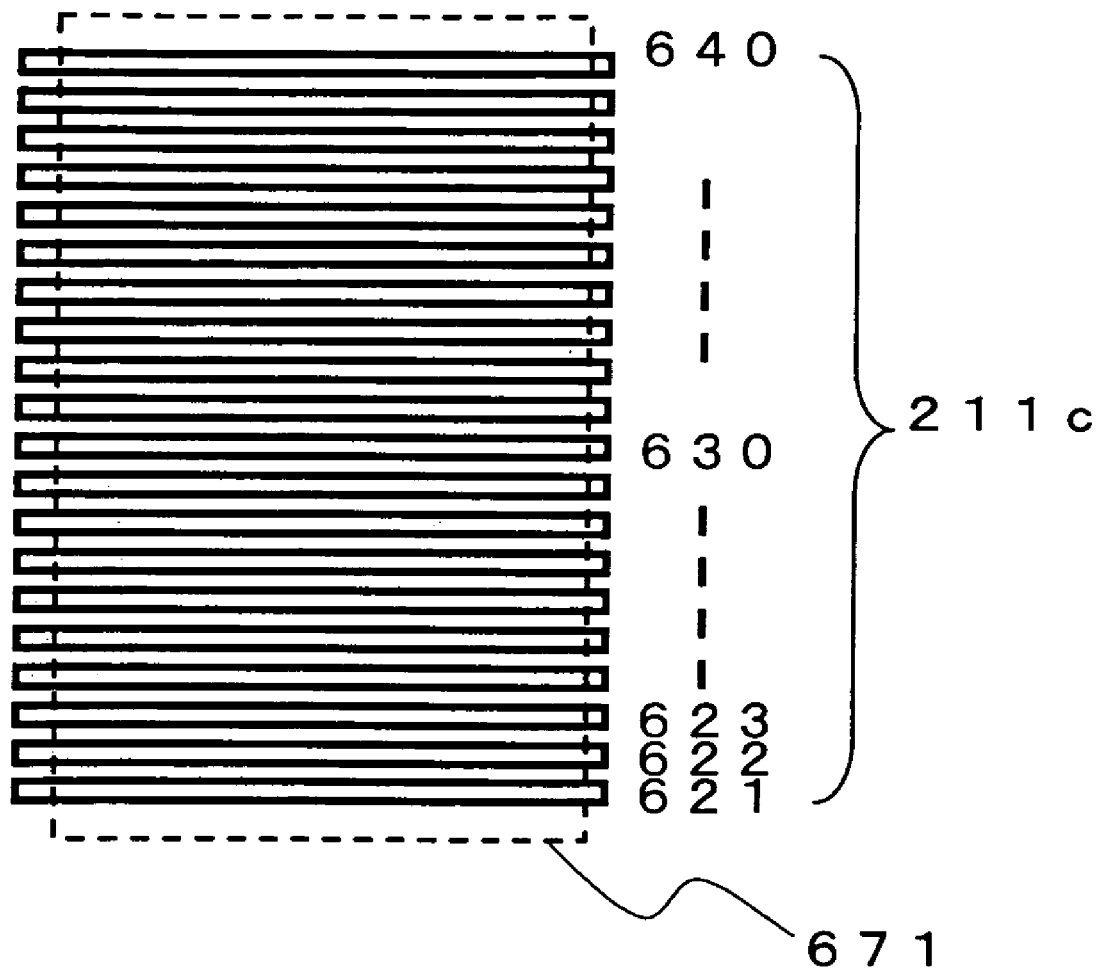
FIG. 9 is a schematic top view showing the structure of a third composite electrode of the liquid crystal beam deflector in the embodiment of the present invention.

Next, a third composite electrode having another configuration, which is especially efficient when a high-speed response is required, will be described. FIG. 9 is a top view showing the relation between the first active area 671 and a third composite electrode 211c for implementing a blazed diffraction grating. Referring to FIG. 9, the third composite electrode 211c comprises striped electrodes, from a first individual electrode 621 to an Nth individual electrode 640 (N=20 for convenience), formed by a transparent conductive film such as ITO that configures the composite electrodes.

To create a blazed diffraction grating in the first active area 671 for beam deflection, a predetermined voltage must be applied to the individual electrodes 621–640 of the third composite electrode 211c. Application means for applying a predetermined voltage pattern is created by separately forming the individual electrodes, first individual electrode 621 to Nth individual electrode 640, as shown in FIG. 9 and by driving the individual electrodes with a drive circuit, such as an independent IC, to generate gradient potentials in the individual electrodes.

Figure 19:
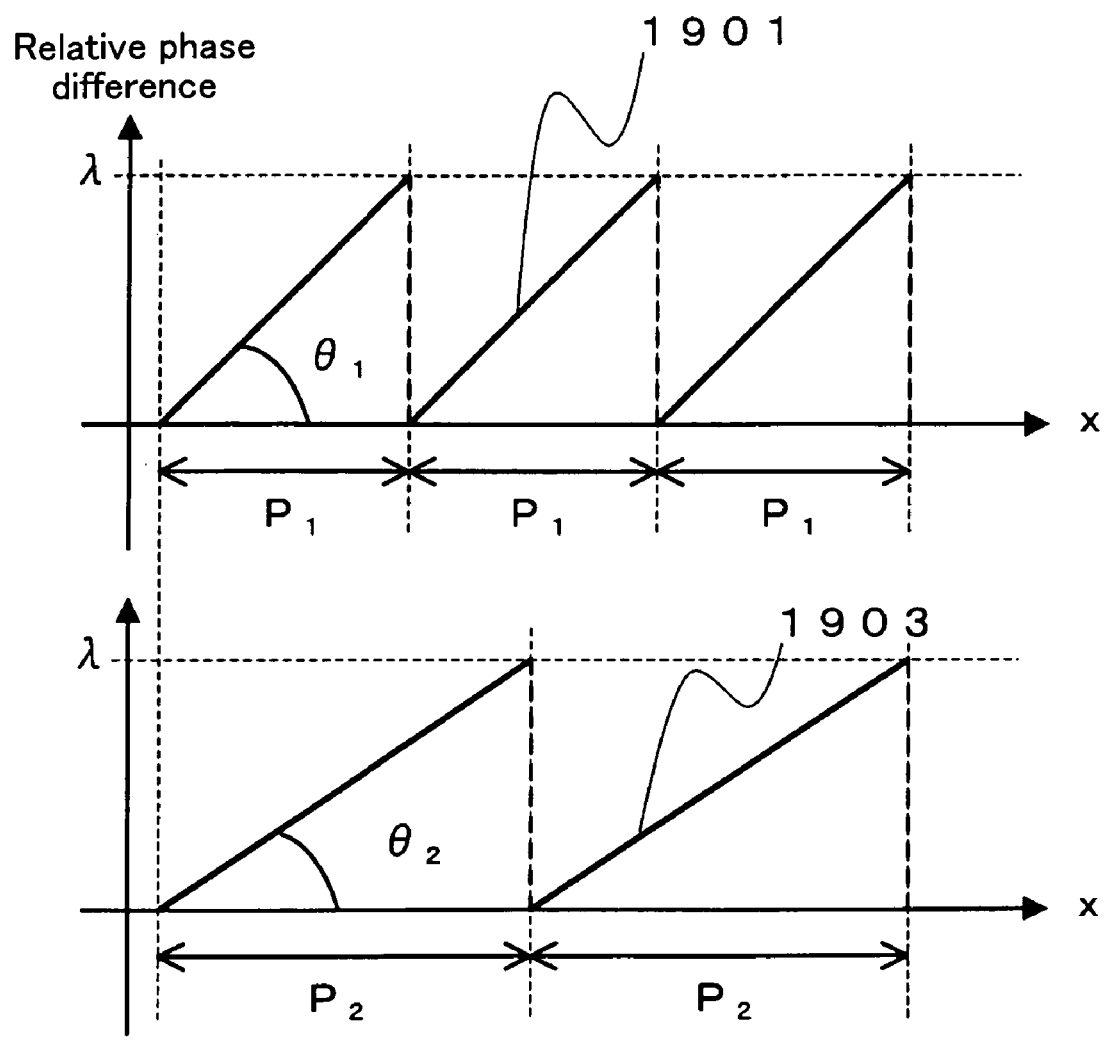
FIG. 19 is a schematic diagram showing a phase distribution in a third composite electrode of the liquid crystal beam deflector in the embodiment of the present invention.

The method for creating any deflection angle using the liquid crystal beam deflector 101 that has the third composite electrode 211c will be described with reference to FIG. 19. In the third composite electrode 211c, any voltage can be independently applied to the individual electrodes directly with the drive circuit. Therefore, when modulation can be performed for the minimum wavelength of 2π (one wavelength), any deflection angle can be created. For example, when voltages are applied to the individual electrodes so that a first phase-modulated waveform 1901 can be created in the first active area 671, the deflection angle θ1 can be given as follows:

$$\tan \theta 1 = \lambda / P1 \tag{8}$$

where λ is the relative phase difference for one wavelength. The x-axis direction is at right angles with the individual electrodes. By resetting the phase in this configuration for one wavelength in the pitch P1 corresponding to the predetermined individual electrodes, the diffraction efficiency can be set close to 100%. Next, when voltages are applied to the individual electrodes to implement a second phase-modulated waveform 1903 in the first active area 671, the deflection angle θ2 is given by the following equation.

$$\tan \theta 2 = \lambda / P2 \tag{9}$$

By changing a predetermined pitch for resetting the phase in this way, any deflection angle θ can be created.

In addition, the liquid crystal beam deflector 101 that uses the third composite electrode 211c can use, for example, not only the linear approximation area 1701 shown in FIG. 16 but also all area of the characteristic curve 1711. This is advantageous in that the liquid crystal cell is made thinner for quick response. This is because any voltage may be applied to the individual electrodes and, therefore, the non-linearity of the characteristic curve 1711 can be corrected to linearity by weighting the applied voltages. Although the configuration of the first composite electrode 211a and second composite electrode 211b requires that the liquid crystal layer be thick to make the phase modulation amount λ or higher, the third composite electrode 211c resets the phase for one wavelength and therefore the liquid crystal layer can be made thinner because it need not be thick.

Figure 20:
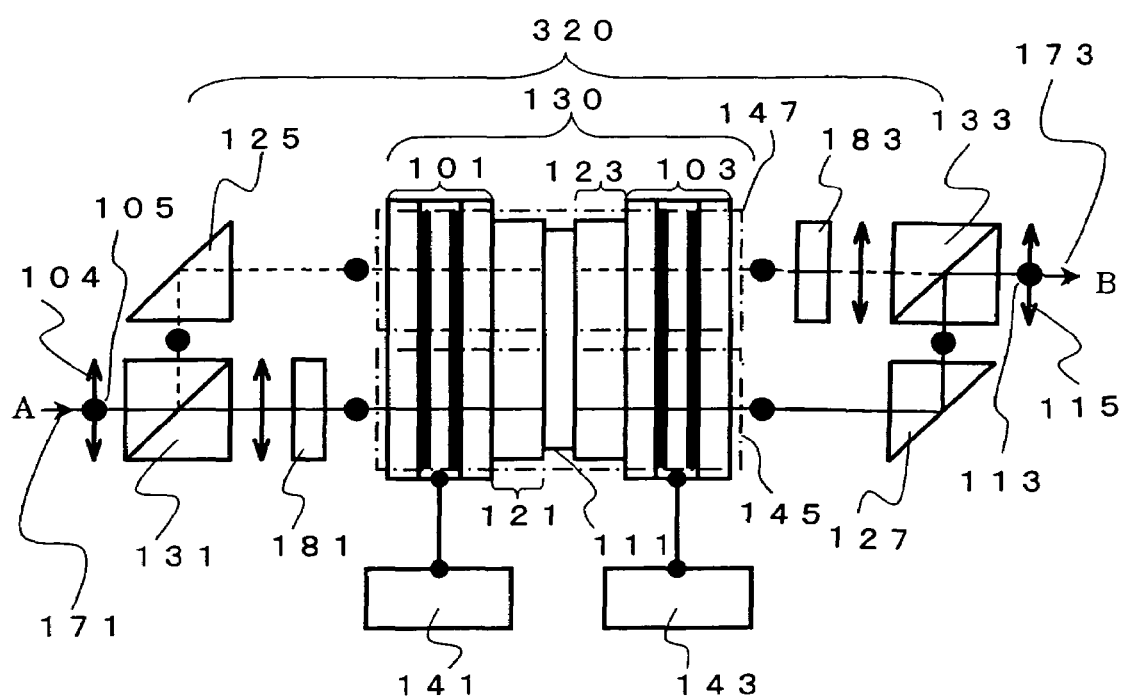
FIG. 20 is a schematic cross sectional diagram showing the module configuration of the liquid crystal variable wavelength filter unit in the embodiment of the present invention.

Finally, with reference to FIG. 20, a module configuration 320 will be described in which the liquid crystal variable wavelength filter unit 130 according to the present invention is used between collimators frequently used in actual optical fiber communication. FIG. 20 shows a configuration viewed from the side of the configuration in FIG. 1 that shows the basic configuration.

The liquid crystal variable wavelength filter unit 130 according to the present invention includes the band pass filter 111 formed of a dielectric multi-layer film inclined by a predetermined angle of α between the liquid crystal beam deflector 101 and the second liquid crystal beam deflector 103, with the band pass filter 111 held between the first wedge prism 121 and the second wedge prism 123. The first drive device 141 is connected to the first liquid crystal beam deflector 101, and second drive device 143 is connected to the second liquid crystal beam deflector 103.

First, consider that an incoming beam 171 enters an input end A in FIG. 20. Although not shown in FIG. 20, the incoming beam 171 is a light that exits an optical fiber and is made parallel by the collimator. The incoming beam 171 is considered to be divided into a first linearly polarized light 104 that becomes a P-polarized light that enters a first polarization splitter 131 and a second linearly polarized light 105 that is an S-polarized light that enters the first polarization splitter 131. In the description below, the P-polarized light that enters the first polarization splitter 131 is indicated by a vertical arrow in the figure, and the S-polarized light that enters the first polarization splitter 131 is indicated by a black circle in the figure.

The first linearly polarized light 104 that enters the first polarization splitter 131 is a P-polarized light and therefore transmits the first polarization splitter 131. Next, the linearly polarized light 104 has its azimuthal angle rotated 90° by a first half-wavelength plate 181 and is converted to a polarized light that vibrates in the same direction as that of an S-polarized light that enters the first polarization splitter 131. In addition, this polarized light passes through a first active area 145 of the first liquid crystal beam deflector 101 and reaches the band pass filter 111. Here, rubbing processing is performed in advance so that the rubbing direction of the alignment film of the first liquid crystal beam deflector 101 and the second liquid crystal beam deflector 103 becomes parallel to the incoming polarized beam. Next, the components of the first linearly polarized light 104 whose incident angle is selected by the first liquid crystal beam deflector 101 and which transmit the band pass filter 111 are deflected by the second liquid crystal beam deflector 103 into the reverse direction of the deflection angle of the light entering the band pass filter 111. That is, when deflected by +θ by the first liquid crystal beam deflector 101, the polarized light is deflected by −θ by the second liquid crystal beam deflector 103. The light that exits the second liquid crystal beam deflector 103 changes its direction at a right angle in a second total reflection mirror 127 and changes its direction at a right angle again in a second polarization splitter 133 and exits output end B as a fourth linearly polarized light 113.

On the other hand, the second linearly polarized light 105 that enters input end A changes its direction at a right angle in the first polarization splitter 131 because it is an S-polarized light, enters a first total reflection mirror 125, changes its direction again at a right angle, passes through a second active area 147 of the first liquid crystal beam deflector 101 as an S-polarized light, and reaches the band pass filter 111. Here, rubbing processing is performed in advance so that the rubbing direction of the alignment film of the first liquid crystal beam deflector 101 and the second liquid crystal beam deflector 103 becomes parallel to the incoming polarized beam. Next, the components of the second linearly polarized light 105 whose incident angle is selected by the first liquid crystal beam deflector 101 and which transmit the band pass filter 111 are deflected by the second liquid crystal beam deflector 103 into the reverse direction of the deflection angle of the light entering the band pass filter 111.

That is, when deflected by $+\theta$ by the first liquid crystal beam deflector 101, the polarized light is deflected. by $-\theta$ by the second liquid crystal beam deflector 103. The light that exits the second liquid crystal beam deflector 103 has its azimuthal angle rotated 90° by a second half-wavelength plate 183, is converted to a P-polarized light that enters the second polarization splitter 133, and exits output end B as a third linearly polarized light 115.

The two linearly polarized lights, 113 and 115, are combined into an outgoing light 173. In the configuration shown in FIG. 20, the optical path length from input end A to output end B can be made equal for the linearly polarized lights 113 and 115. Although not shown, the outgoing light 173 is coupled to an optical fiber via a collimator lens as necessary.

As described above, the point at which the light passing through the first active area 145 intersects with the band pass filter 111 and the point at which the light passing through the second active area 147 intersects with the band pass filter 111 are different in the band pass filter 111. Therefore, there is a possibility that the reflection and the transmittance characteristics of the band pass filter 111 vary in the plane. To solve this variation problem, it is desirable that the composite electrode of the first liquid crystal beam deflector 101 and the second liquid crystal beam deflector 103 be divided into two areas as in a fourth composite electrode shown in FIG. 10 and that the function to control those two areas independently through a drive circuit be provided.

Figure 10:
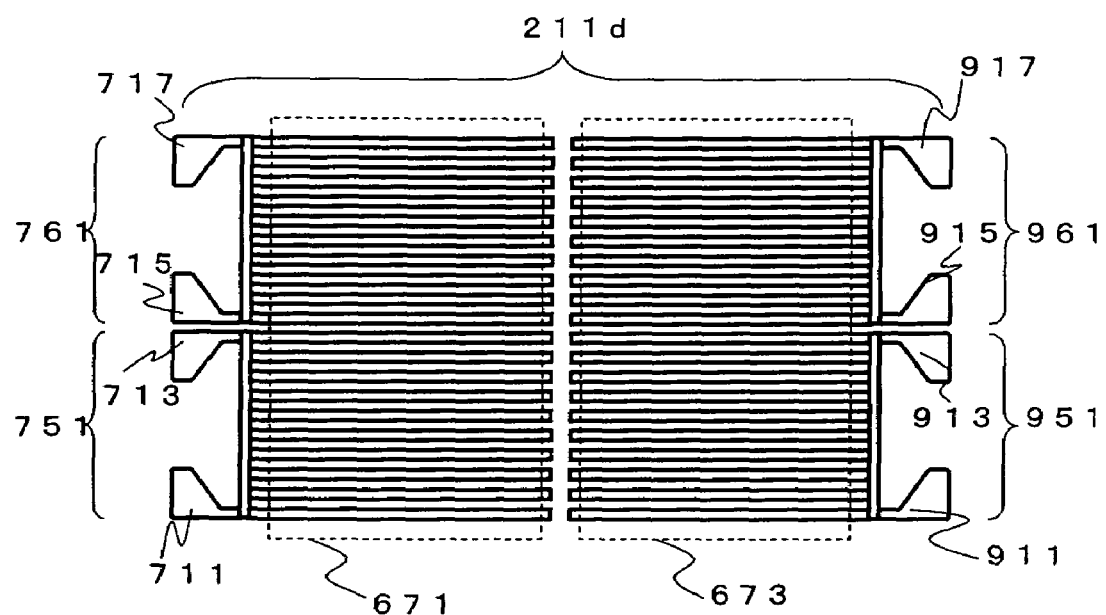
FIG. 10 is a schematic top view showing the structure of a fourth composite electrode of the liquid crystal beam deflector in the embodiment of the present invention.

FIG. 10 is a top view of a fourth composite electrode 211*d* that has the first active area 671 and a second active area 673. To control the first active area 671 and the second active area 673 independently, this fourth composite electrode 211*d* has the first composite electrode 211*a*, shown in FIG. 7, in two planes. The first active area 671 is the same as the first composite electrode 211*a*. The structure of the fourth composite electrode is that the second active area 673 includes a third element grating 951 and a fourth element grating 961. The third element grating 951 has a ninth signal electrode 911 and a tenth signal electrode 913 to apply a drive waveform, and the fourth element grating 961 has an eleventh signal electrode 915 and a twelfth signal electrode 917. Although the first and second active areas 671 and 673 of the fourth composite electrode 211*d* each have two element gratings for convenience, any number of element gratings may be added according to the specifications. As described above, the fourth composite electrode 211*d* in this configuration has a structure efficient for separately controlling the input to the liquid crystal variable wavelength filter unit.

The combination of the liquid crystal beam deflectors and the band pass filter is not limited to the configuration described above in which the band pass filter is held between two liquid crystal beam deflectors but may have another configuration.

Figure 21:
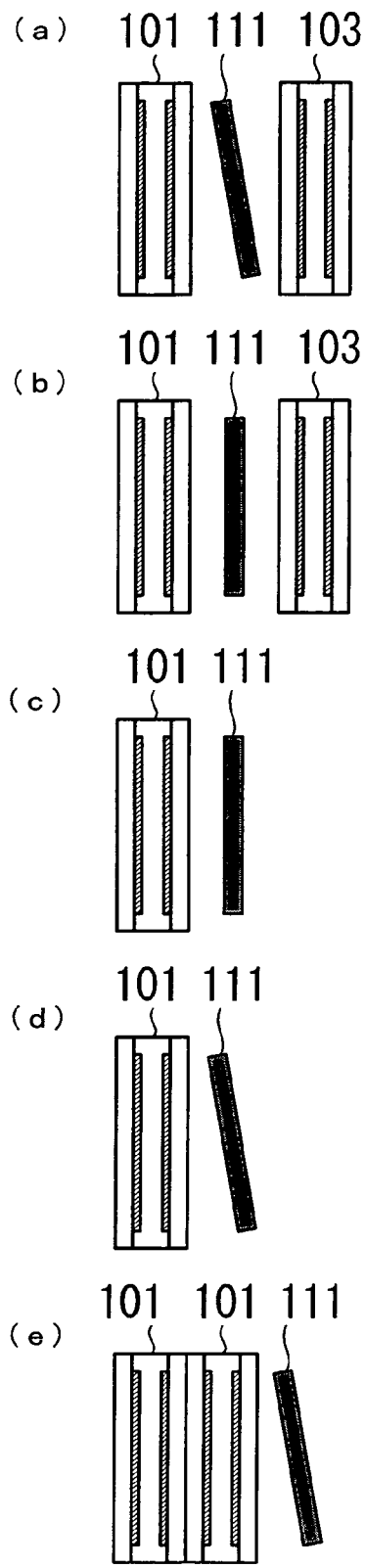
FIG. 21 is a diagram showing a combination of the liquid crystal beam deflator and the band pass filter of the liquid crystal variable wavelength filter unit of the present invention.

FIG. 21 is a diagram showing combinations of the liquid crystal beam deflectors and the band pass filter in the liquid crystal variable wavelength filter unit according to the present invention.

A configuration example in FIG. 21(*a*) shows a configuration in which the band pass filter 111 is held between the two liquid crystal beam deflectors 103 and the band pass filter 111 is inclined a predetermined angle with respect to the two liquid crystal beam deflectors 101 and 103. This configuration makes parallel the incoming beam and the outgoing light to and from the liquid crystal variable wavelength filter unit, increases the coefficient of the optical coupling to a low light system composed of optical fibers and collimators, minimizes the coupling loss, and makes a single mode fiber available for use as an outgoing optical system.

A configuration example in FIG. 21(*b*) shows a configuration in which the band pass filter 111 is arranged in parallel to the two liquid crystal beam deflectors 101 and 103 in the configuration example in FIG. 21(*a*). In this configuration, it is also possible to adjust the deflection angle of the liquid crystal beam deflectors 101 and 103 to make parallel the incoming beam and the outgoing light to and from the liquid crystal variable wavelength filter unit.

The configuration examples in FIGS. 21(*c*) and (*d*) each show a combination of one liquid crystal beam deflector 101 and one band pass filter 111 in which the band pass filter 111 is provided at the outgoing side of the liquid crystal beam deflector 101. The configuration example in FIG. 21(*c*) shows a configuration in which the liquid crystal beam deflector 101 and the band pass filter 111 are parallel, and the configuration example in FIG. 21(*d*) shows a configuration in which the band pass filter 111 is at a slant to the liquid crystal beam deflector 101.

Although the incoming beam and the outgoing light are not parallel in the configuration examples in FIGS. 21(*c*) and (*d*), the outgoing light can be obtained by using a multi-mode fiber as the optical system.

A configuration example in FIG. 21(*e*) shows a combination of a plurality of liquid crystal beam deflectors 101 and one band pass filter 111. The figure shows an example of two liquid crystal beam deflectors 101. A plurality of liquid crystal beam deflectors 101 are stuck together with the band pass filter 111 at the outgoing side. The deflection angle can be increased by sticking a plurality of liquid crystal beam deflectors 101 together and by allowing the two liquid crystal beam deflectors to have the same deflection angle. By allowing the two liquid crystal beam deflector 101 to have deflection angles at right angles to each other, the incoming beam does not depend on the polarization.

Although a linearly polarized component is a specific polarized component of a light that enters the liquid crystal beam deflector and the utilization of the light of that component is increased in the above description, it is of course possible to apply the configuration of the present invention to a light of other components.

As apparent from the above description, the liquid crystal variable wavelength filter unit according to the present invention has a high isolation characteristic in a stop band near the transmission band and a flat transmission band characteristic both of which cannot be attained by the conventional liquid crystal variable wavelength filter (tunable filter).

In addition, the liquid crystal variable wavelength filter unit according to the present invention can be used to allow a filter, which has ideal characteristics according to the specifications, to have transmission and reflection characteristics and, in addition, to implement a variable wavelength filter unit suitable for optical fiber communication that is simple in structure and that can be simply controlled for driving.

The configuration that makes parallel an incoming beam and an outgoing light to and from the liquid crystal variable wavelength filter unit according to the present invention is efficient because it can increase the coefficient of the optical coupling to a low light system composed of optical fibers and collimators and minimize the coupling loss.

INDUSTRIAL APPLICABILITY

The scope of the present invention is not limited by the unit described above but can be applied to a liquid crystal variable wavelength filter unit that is applied to a free space optical communication and other optical signal processing systems.

The invention claimed is:

1. A liquid crystal variable wavelength filter unit capable of selecting a predetermined wavelength of an incoming beam using liquid crystal, comprising:
a liquid crystal beam deflector for making an outgoing angle of a transmission light variable; and
a band pass filter provided on an outgoing side of the liquid crystal beam deflector
wherein a wavelength is selected based on the outgoing angle of a light entering the band pass filter.

2. The liquid crystal variable wavelength filter unit according to claim 1 wherein said liquid crystal beam deflector makes the outgoing angle variable within a predetermined positive or negative angle range, including a vertical angle, with respect to an incoming surface of the band pass filter.

3. The liquid crystal variable wavelength filter unit according to claim 1 or 2 wherein said liquid crystal beam deflector and said band pass filter are arranged vertically to an incoming beam.

4. The liquid crystal variable wavelength filter unit according to claim 1 or 2 wherein said liquid crystal beam deflector is arranged vertically to an incoming beam and said band pass filter is inclined by a predetermined angle with respect to the incoming beam.

5. The liquid crystal variable wavelength filter unit according to claim 1 or 2 wherein a plurality of liquid crystal beam deflectors are stuck together to make an outgoing angle variable, said outgoing angle being a sum of deflection angles of the liquid crystal beam deflectors.

6. The liquid crystal variable wavelength filter unit according to claim 1 wherein said liquid crystal beam deflector has a liquid crystal layer held between a first transparent substrate, which has a plurality of individual electrodes formed of transparent conductors arranged in a parallel stripe form, and a second transparent substrate, which has a common electrode formed of a transparent conductor, and is configured in such a way that a refractive index modulation is generated in the liquid crystal layer by applying a predetermined voltage to the individual electrodes formed on the first transparent substrate and
wherein there are two of said liquid crystal beam deflectors between which a band pass filter is included.

7. The liquid crystal variable wavelength filter unit according to claim 1 or 2 wherein said band pass filter is a dielectric multi-layered film formed by alternately laminating a high refractive layer and a low refractive layer.

8. The liquid crystal variable wavelength filter unit according to claim 6 wherein said plurality of individual electrodes are divided into a plurality of groups, a plurality of individual electrodes of each group are connected to a common collector electrode, and a pair of signal electrodes are connected to both ends of the collector electrode.

9. The liquid crystal variable wavelength filter unit according to claim 8 wherein said collector electrode is formed of the same material as that of said plurality of individual electrodes.

10. The liquid crystal variable wavelength filter unit according to claim 6 wherein the liquid crystal layers of said two liquid crystal beam deflectors are arranged almost in parallel and said band pass filter is inclined a predetermined angle with respect to said two liquid crystal beam deflectors.

11. The liquid crystal variable wavelength filter unit according to claim 6 wherein the two liquid crystal beam deflectors has a function to make parallel an incoming beam and an outgoing light to and from said liquid crystal variable wavelength filter unit by changing a light of a specific deflection component, which enters one of the liquid crystal beam deflectors, by a predetermined angle of $\theta$ and by changing the light by an angle of $-\theta$ by another liquid crystal beam deflector.

12. A driving method for the liquid crystal variable wavelength filter unit of claim 8 wherein drive waveforms at different voltages are applied to a pair of signal electrodes of at least one of the groups.

13. The driving method for the liquid crystal variable wavelength filter unit of claim 8 wherein a period, in which an alternating voltage is applied to one of signal electrodes of a pair of signal electrodes of at least one of the groups and another signal electrode is set to 0[V], and a period, in which an alternating voltage is applied to said another signal electrode and said one of signal electrodes is set to 0[V], are provided alternately.

14. The driving method for the liquid crystal variable wavelength filter unit according to claim 13 wherein said alternating voltage is a voltage generated through pulse width modulation.

15. The method for driving the liquid crystal variable wavelength filter unit according to one of claims 12–14 wherein there is a period in which an alternate current bias is applied from said common electrode to said liquid crystal layer.

* * * * *